(12) United States Patent
Nakamura

(10) Patent No.: US 7,087,358 B2
(45) Date of Patent: Aug. 8, 2006

(54) IMAGE-FORMATION MATERIAL AND INFRARED ABSORBER

(75) Inventor: Ippei Nakamura, Shizuoka-ken (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/790,775

(22) Filed: Mar. 3, 2004

(65) Prior Publication Data

US 2004/0175649 A1    Sep. 9, 2004

Related U.S. Application Data

(62) Division of application No. 09/871,724, filed on Jun. 4, 2001, now Pat. No. 6,727,037.

(30) Foreign Application Priority Data

Jun. 6, 2000    (JP) .............................. 2000-169180

(51) Int. Cl.
*G03F 7/004* (2006.01)

(52) U.S. Cl. .............. 430/270.1; 430/302; 430/270.15; 548/159; 548/455

(58) Field of Classification Search ............ 430/270.1, 430/281.1, 286.1, 302, 309; 548/159, 455
See application file for complete search history.

(56) References Cited

U.S. PATENT DOCUMENTS

| 4,555,481 A * | 11/1985 | Ukai et al. .................. 430/550 |
| 5,512,416 A | 4/1996 | Namba et al. |
| 6,192,799 B1 | 2/2001 | Damme et al. |
| 6,214,518 B1 | 4/2001 | Kunita et al. |
| 6,673,510 B1 * | 1/2004 | Nakamura et al. ....... 430/270.1 |
| 6,727,037 B1 * | 4/2004 | Nakamura ............... 430/270.1 |

FOREIGN PATENT DOCUMENTS

| EP | 0 901 902 A2 | 3/1999 |
| EP | 1 053 868 A2 | 11/2000 |
| EP | 1 093 934 A1 | 4/2001 |
| EP | 1 223 196 A2 | 7/2002 |
| EP | 1 382 460 A1 * | 1/2004 |
| JP | 2000-289341 * | 10/2000 |

OTHER PUBLICATIONS

European Search Report dated Nov. 7, 2002, in EP Application No. 01 11 2937.

* cited by examiner

*Primary Examiner*—Amanda Walke
(74) *Attorney, Agent, or Firm*—Buchanan Ingersoll PC

(57) ABSTRACT

A heat mode-applicable image-formation material having high sensitivity and excellent image-forming property, and a novel infrared absorber which can be suitably used in this material. The present invention relates to a substrate carrying thereon an image-formation layer which contains an infrared absorption agent. The agent has at least one surface orientation group in the molecule, and solubility of the image-formation layer in an alkaline aqueous solution is changed by action of radiation in the near-infrared range. Preferable as the infrared absorbing agent is an infrared absorber comprising, in a molecule thereof, a fluorine-containing substituent which have at least 5 fluorine atoms, or a polymethine chain of at least 5 carbon atoms and an alkyl group of at least 8 carbon atoms, said alkyl group being connected to the polymethine chain via any of nitrogen, oxygen and sulfur.

5 Claims, No Drawings

IMAGE-FORMATION MATERIAL AND INFRARED ABSORBER

CROSS-REFERENCE TO RELATED APPLICATIONS

This application is a divisional of application Ser. No. 09/871,724, filed Jun. 4, 2001 now U.S. Pat. No. 6,727,037 which in turn claims priority to Japanese Application No. 2000-169180, filed Jun. 6, 2000.

BACKGROUND OF THE INVENTION

1. Field of the Invention

The present invention relates to a positive or negative image-formation material which can be recorded image-wise by exposure to an infrared laser and in which solubility of a recording layer at exposed portions changes, and to an infrared absorber which can be suitably used in the image-formation material. More particularly, the present invention relates to an image-formation material with an infrared layer, which can be recorded by exposure to an infrared laser or the like in the near-infrared range, and particularly which is suitable for a planographic printing plate used for so-called direct plate formation which can provide plate formation directly from digital signals of computers and the like, and to an infrared absorber having a surface orientation group, which absorber is suitable for application in the image-formation material.

2. Description of the Related Art

Recently, with the development of solid lasers and semi-conductor lasers having an emitting region in near-infrared to infrared ranges, systems using infrared lasers and providing direct plate formation from digital data of computers have drawn attention.

JP-A No. 7-285275 discloses a positive-type planographic printing material for infrared lasers used in direct plate formation. This invention is an image-recording material obtained by adding to an alkaline aqueous solution-soluble resin a substance which absorbs light and generates heat, and a positive photosensitive compound such as a quinonediazide compound or the like. The positive photosensitive compound acts in image portions as a solution inhibitor that substantially decreases solubility of the alkaline aqueous solution-soluble resin, and is decomposed in non-image portions by heat, leading to a loss of solution-inhibiting ability. Resultantly, the positive photosensitive compound can be removed by development, to form an image.

On the other hand, it is known that onium salts and alkali-insoluble compounds which can form hydrogen bonds act to suppress alkali-solubility of an alkali-soluble polymer. Regarding an image-formation material for infrared lasers, WO97/39894 describes that a composition using a cationic infrared absorber as an agent to suppress dissolution of an alkaline water-soluble polymer shows a positive action. This positive action is such that an infrared absorber absorbs laser light and an effect of suppressing dissolution of a polymer film at irradiated portions is reduced by generated heat, to form an image.

Further, as a method for forming negative images, there is a recording method in which a polymerization reaction is allowed to occur using, as an initiator, radicals generated by light or heat. The reaction cures a recording layer at exposed portions, forming image portions. Regarding such printing plates having a recording layer which is polymerized by light or heat, there are known technologies using, as a photosensitive layer, photopolymerizable or heat-polymerizable compositions as described in JP-A Nos. 8-108621 and 9-34110.

Regarding image-forming properties of the above-mentioned various recording materials, there is a problem in that, although energy sufficient for an image formation reaction is obtained at the surface of a sensitive material irradiated by a laser, thermal diffusion to a substrate is extensive, due to excellent thermal diffusion, and particularly due to excellent heat conductivity when a generally-used aluminum substrate is used as the substrate. Consequently, energy is not sufficiently utilized for forming images, leading to low sensitivity. With this problem, a sufficient effect of reducing suppression of dissolution or an effect of promoting a reaction by polymerization may not be obtained in deep portions of the sensitive material. Consequently, the occurrence of alkali development at exposed portions/non-exposed portions may not be fully realized, such that excellent images cannot be obtained, and furthermore, developing latitude, that is, tolerable range which can afford good image-formation when concentration of an alkaline developing solution is varied, is narrow.

SUMMARY OF THE INVENTION

Therefore, an object of the present invention is to provide an image-formation material having high sensitivity and excellent image-forming property, and a novel infrared absorber which can be suitably used in this material.

The present inventor has intensively studied for the purpose of improving sensitivity and image-forming property of image-formation materials, and has consequently found that both sensitivity and image-forming property can be improved by using an infrared absorption agent having a specific substituent. Further, the inventor has found a novel infrared absorber that can be suitably used in this agent, leading to completion of the present invention.

That is, the image-formation material of the present invention is a heat mode-applicable image-formation material, the image-formation material having: a substrate; and an image-formation layer on the substrate which contains an infrared absorption agent having at least one surface orientation group in a molecule thereof, solubility of the image-formation layer in an alkaline aqueous solution being changeable by action of near-infrared range radiation.

Here, in a preferable embodiment, the above-mentioned infrared absorption agent is an infrared absorber having at least one surface orientation group selected from fluorine-containing substituents and long chain alkyl groups.

Further, the infrared absorber of the present invention is characterized in that it has in the molecule a fluorine-containing substituent having at least 5 fluorine atoms.

As the infrared absorber having such a fluorine substituent, there are specifically exemplified infrared absorbers which manifest absorption in the near-infrared range, represented by the following general formulae (1) to (3).

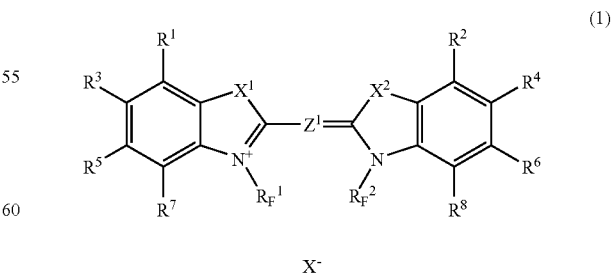

In general formula (1): each of $R_F^1$ and $R_F^2$ independently represents a fluorine-containing substituent having at least 5 fluorine atoms; each of $X^1$ and $X^2$ independently represents $-CR^9R^{10}-$, $-S-$, $-S-$, $-NR^{11}-$, $-CH=CH-$ or —O—. $R^1$ to $R^8$ each independently represents a hydrogen atom, alkyl group, alkoxy group or halogen atom. $R^1$ to $R^8$ may represent a plurality of atoms such that at least one of pairs $R^1$ and $R^3$, $R^2$ and $R^4$, $R^5$ and $R^7$, $R^6$ and $R^8$, $R^1$ and $X^1$, or $R^2$ and $X^2$ can be mutually connectable to form an aliphatic 5-membered ring or 6-membered ring, an aromatic 6-membered ring or a substituted aromatic 6-membered ring.

$R^9$ and $R^{10}$ each independently represents an alkyl group, or represent =CH— which are combined to form a ring; $R^{11}$ represents an alkyl group.

$Z^1$ represents a heptamethine group, which may have one or more substituents selected from alkyl groups, halogen atoms, amino groups, arylthio groups, alkylthio groups, aryloxy groups, alkoxy groups, barbituric groups and thiobarbituric groups, and which may include a cyclohexene or cyclopentene ring formed by mutually bonding substituents on two methine carbons of the heptamethine group, which ring may further have a substituent selected from alkyl groups and halogen atoms.

$X^-$ represents a counter ion necessary for neutralizing an electric charge.

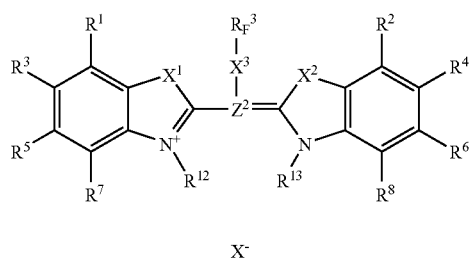

In general formula (2): $R_F^3$ represents a fluorine-containing substituent having at least 5 fluorine atoms. $X^3$ represents —NH—, —O— or —S—. $Z^2$ represents a polymethine chain of at least 5 carbon atoms. Each of $R^{12}$ and $R^{13}$ independently represents an alkyl group. These alkyl groups may have a substituent, and as preferable substituents, aryl groups such as a phenyl group, toluyl group and the like, alkoxy groups such as a methoxy group, ethoxy group, methoxyethoxy group and the like, aryloxy groups such as a phenoxy group, toluyloxy groups and the like, acid groups such as a carboxyl group, sulfonic group and the like or salts thereof, quaternary ammonium groups such as a triethylammonium group, tributylammonium group and the like, a hydroxyl group, amide groups and the like are exemplified.

$X^1$, $X^2$, $R^1$ to $R^8$ and $X^-$ are as defined for the above-mentioned general formula (1).

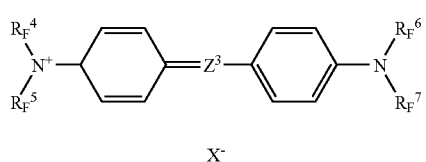

In general formula (3): each of $R_F^4$, $R_F^5$, $R_F^6$ and $R_F^7$ independently represents a fluorine-containing substituent having at least 5 fluorine atoms or an alkyl group, and at least one of $R_F^4$, $R_F^5$, $R_F^6$ and $R_F^7$ represents a fluorine-containing substituent having at least 5 fluorine atoms. $Z^3$ represents a pentamethine group, which may have a substituent selected from halogen atoms, hydroxyl groups, alkyl groups, aryl groups and heterocyclic groups. Here, the alkyl group and aryl group may further have a substituent, and as preferable further substituents, aryl groups such as a phenyl group, toluyl group and the like, alkoxy groups such as a methoxy group, ethoxy group, methoxyethoxy group and the like, aryloxy groups such as a phenoxy group, toluyloxy groups and the like, are exemplified. Further, this pentamethine group may also contain a cyclohexene or cyclopentene ring formed by mutually bonding substituents on two methine carbons of the pentamethine group, which ring may further have a substituent selected from alkyl groups and halogen atoms.

$X^-$ represents a counter ion necessary for neutralizing an electric charge.

Further, the infrared absorber of the present invention may preferably have a polymethine chain of at least 5 carbon atoms, and an alkyl group of at least 8 carbon atoms, the alkyl group being connected to the polymethine chain via any of nitrogen, oxygen and sulfur.

As such an infrared absorber, infrared absorbers of the following general formula (4) are specifically listed.

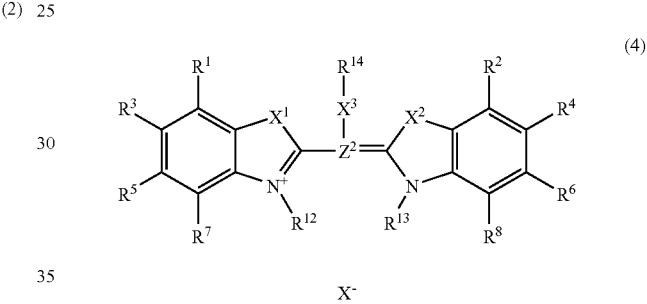

In general formula (4): $R^{14}$ represents an alkyl group of at least 8 carbon atoms. $X^3$ represents —NH—, —O— or —S—. $Z^2$ represents a polymethine chain of at least 5 carbon atoms. Each of $R^{12}$ and $R^{13}$ independently represents an alkyl group, and may have the same substituents as in the general formula (2).

$X^1$, $X^2$, $R^1$ to $R^8$ and $X^-$ are as defined for the above-mentioned general formula (1).

Although action of the present invention is not clear, it is believed that by using an infrared absorber which manifests absorption in the near-infrared range and has a surface orientation group as the infrared absorption agent to be used in the image-formation material of the present invention, an infrared absorption agent is localized on the outermost surface (air interface) of a photosensitive layer. Thus, diffusion of heat generated near the surface into a substrate is suppressed, and the generated heat is utilized efficiently for forming images. Consequently, an increase in sensitivity can be attained.

Further, from the investigations of the present inventor, it is apparent that when a resin layer containing an infrared absorber having a surface orientation group is irradiated by an infrared laser, the surface contact angle of the resin layer increases. Resultantly, in the image-formation material of the present invention, permeability of a developing solution at exposed portions of the image-formation layer lowers. Therefore, particularly in the case of use as a negative recording material, there is also a benefit in that discrimination can be expanded.

In the present invention, "heat mode-applicable" means that recording by heat mode exposure is possible. The definition of the heat mode exposure in the present invention will be explained in detail. As described in Hans-Joachim Timpe, IS&Ts NIP 15: 1999 International Conference on Digital Printing Technologies, P. 209, it is known that there are two modes with respect to a process in which photo-excitation of a light-absorbing substance (for example, dye) in a photosensitive material causes a chemical or physical change to form an image. One is a so-called photon mode in which a light-absorbing substance which has been photo-excited is deactivated by a certain photochemical interaction (for example, energy transfer or electron transfer) with another reactive substance in the photosensitive material, and the resulting activated reactive substance causes a chemical or physical change required for the above mentioned image-formation. The other is a so-called heat mode in which a light-absorbing substance that has been photo-excited is deactivated via heat emission, and a reactive substance, by utilizing this heat, causes a chemical or physical change required for the image-formation. Additionally, special modes such as ablation, in which substances are explosively spattered by locally concentrated light energy, multi-photon absorption, in which one molecule absorbs a lot of photons at one time, and the like are listed. However, these modes are omitted in this specification.

An exposure process utilizing one of the above-mentioned modes is called photon mode exposure or heat mode exposure. A technical difference between the photon mode exposure and the heat mode exposure is whether or not the energy amount of several photons of exposure light can be added and utilized for the energy amount required for the intended reaction. For example, it is hypothesized to use n photons to cause a certain reaction. In photon mode exposure, it is impossible to add the energy amount of photons to each other, due to quantum laws of conservation of energy and momentum, since a photochemical interaction is utilized. That is, to cause some reaction, the relationship: "energy amount of one photon≧energy amount of reaction" must apply. On the other hand, in the heat mode exposure, it is possible to add and utilize the energy amount of multiple photons, since heat is generated from photo-excitation; thus, the light energy is converted into heat and utilized. Therefore, the relationship: "energy amount of n photons≧energy amount of reaction" is sufficient. However, this addition of energy amounts is limited by thermal diffusion. That is, if the next light-excitation-de-activation process occurs and heat is generated until heat is liberated by thermal diffusion from the exposed portion (reaction point) in question, the heat is invariably accumulated and added, leading to an increase in temperature of this part. However, if the next generation of heat is delayed, the heat is liberated and not accumulated. That is, in the heat mode exposure, there is a difference of result between a case of irradiation with light having a high energy amount for a short period of time and a case of irradiation with light having a low energy amount for a long period of time, even when the total exposure energy amount is the same. The case of a short period of time is advantageous for accumulation of heat.

Of course, in the photon mode exposure, such a phenomenon basically does not occur, although analogous phenomenon may occur in some cases by the influence of diffusion of subsequent reaction species.

That is, from the standpoint of properties of a photosensitive material, inherent sensitivity of a photosensitive material (energy amount for reaction required to form image) is constant with respect to exposure power density ($W/cm^2$) (=energy density per unit time) in the photon mode, while in the heat mode, the inherent sensitivity of the photosensitive material increases with the exposure power density. Therefore, when modes are compared, if an exposure time appropriate to maintain practically necessary productivity of an image-recording material is actually fixed, in the photon mode exposure, a high sensitivity of about 0.1 $mJ/cm^2$ can be usually attained. However, since a reaction occurs at any lower exposure amount, a problem of low-exposure fogging at non-exposed portions tends to occur. On the other hand, in the heat mode exposure, reaction occurs only at an exposure amount of a certain level or more, and an exposure amount of about 50 $mJ/cm^2$ is usually necessary in view of a relationship with thermal stability of a photosensitive material. However, problems with low exposure light are avoided.

Thus, in the heat mode exposure in actuality, an exposure power density on the surface of a photosensitive material of 5,000 $W/cm^2$ or more, preferably 10,000 $W/cm^2$ or more is necessary. Use of a laser with a high power density of $5.0 \times 10^5$ $W/cm^2$ or more is not preferable, due to problems such as occurrence of abrasion, staining of a light source, and the like, though this is not described in detail herein.

DESCRIPTION OF THE PREFERRED EMBODIMENTS

[Infrared Absorption Agent Having in a Molecule at Least One Surface Orientation Group]

The infrared absorption agent used in the image-formation material of the present invention is an infrared absorption agent having in the molecule thereof at least one surface orientation group. By action of this surface orientation group, when a coating solution of an image-formation layer is applied and dried to form the image-formation layer, the infrared absorption agent shifts to places near the surface of the image-formation layer, and is localized.

As such a surface orientation group, there are listed functional groups having high hydrophobicity, such as those used as a hydrophobic group of a surfactant. Among these, fluorine-containing substituents, long chain alkyl groups having 8 or more carbon atoms, polysiloxane groups (silicone groups) and the like are suitably listed. These surface orientation groups may be present alone in a molecule, or a plurality of such groups may be present in a molecule.

Regarding function of an infrared absorption agent contained in the image-formation material of the present invention, the agent generates heat when irradiated with radiation in the near-infrared range, typically by exposure to infrared light, and recording is conducted by this heat, similarly to a usual infrared absorption agent contained in a recording material which can effect image-formation by exposure in the infrared range. Therefore, it is required that infrared laser light is efficiently converted into heat by the infrared absorption agent localized on the surface of the image-formation layer, and is efficiently used in a reaction for forming images.

The infrared absorption agent herein used manifests absorption in the near-infrared range, and specifically, manifests absorption in a wavelength range from 720 nm to 1200 nm, and preferably has an absorption maximum in the wavelength range from 720 nm to 1200 nm.

The present inventor has investigated infrared absorbers having a surface orientation group selected from fluorine-containing substituents, long chain alkyl groups and the like, and have found a novel infrared absorber which can be suitably used in the image-formation material of the present invention. This infrared absorber is an infrared absorber having a fluorine-containing substituent having at least 5 fluorine atoms, which is a surface orientation group, or a near-infrared absorber having a polymethine chain that has 5 or more carbon atoms and having an alkyl group that has 8 or more carbon atoms connected to the polymethine chain via any of nitrogen, oxygen and sulfur.

These novel infrared absorbers are described below.

As the infrared absorber having a fluorine-containing substituent having at least 5 fluorine atoms, infrared absorbers having in the molecule a chromophore which manifests absorption in the near-infrared range as a base skeleton and having at least one of the above-mentioned substituents in the molecule are listed.

As the fluorine-containing substituent having at least 5 fluorine atoms, there are listed, for example, $-(CH_2)_n(CF_2)_m CF_3$, $-(CH_2)_n CF_2(CF_2)_m H$ (wherein, n represents an integer from 0 to 6 and m represents an integer from 2 to 16), groups having fluorine atoms at five positions excepting the connecting group of a benzene ring, a pentafluorophenyl group and the like.

Of these, infrared absorbers having a polymethine chain of the above-mentioned general formulae (1) to (3) are listed as preferable examples, in view of light-heat converting function and stability as an infrared absorber.

The infrared absorbers as described above are specifically described in detail, but do not limit the scope of the present invention.

The structures of the following exemplified compounds (IR-1) to (IR-24) are shown specifying a counter ion $X^-$, since base skeletons, fluorine-containing substituents, other substituents present on chromophores and chromophores have electric charge.

As compounds represented by the general formula (1), the following exemplified compounds (IR-1) to (IR-15) are listed.

| | $R^1$ | $Z^1$ | $X^-$ |
|---|---|---|---|
| IR-1 | $-CH_2(CF_2)_6CF_3$ | Cl | 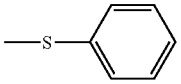 |
| IR-2 | $-CH_2(CF_2)_6CF_3$ | 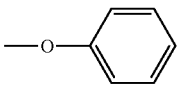 | $ClO_4^-$ |
| IR-3 | $-CH_2(CF_2)_6CF_3$ | 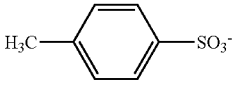 | $ClO_4^-$ |
| IR-4 | $-CH_2CH_2(CF_2)_5CF_3$ | Cl | 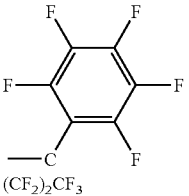 |
| IR-5 | $-CH_2CH_2(CF_2)_5CF_3$ | Cl | $ClO_4^-$ |
| IR-6 | 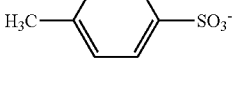 | Cl | 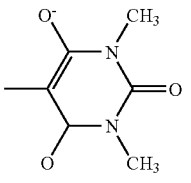 |
| IR-7 | $-CH_2(CF_2)_2CF_3$ | Cl | $ClO_4^-$ |
| IR-8 | $-CH_2CH_2(CF_2)_5CF_3$ | (structure shown) | None |

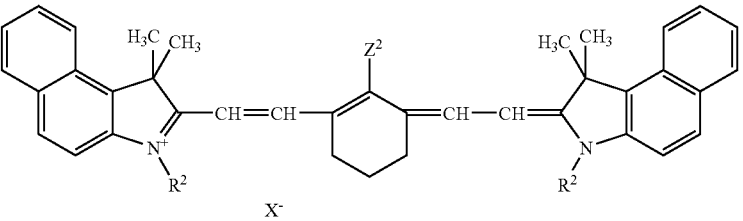
|  | R² | Z² | X⁻ |
|---|---|---|---|
| IR-9 | —CH₂(CF₂)₆CF₃ | Cl |  |
| IR-10 | —CH₂CH₂(CF₂)₅CF₃ | Cl | ClO₄⁻ |
| IR-11 | —CH₂(CF₂)₂CF₃ | Cl | ClO₄⁻ |
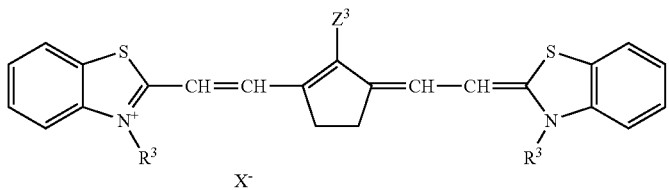
|  | R₃ | Z³ | X⁻ |
|---|---|---|---|
| IR-12 | —CH₂(CF₂)₆CF₃ | Cl | 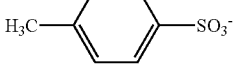 |
| IR-13 | —CH₂CH₂(CF₂)₅CF₃ | —NPh₂ | ClO₄⁻ |
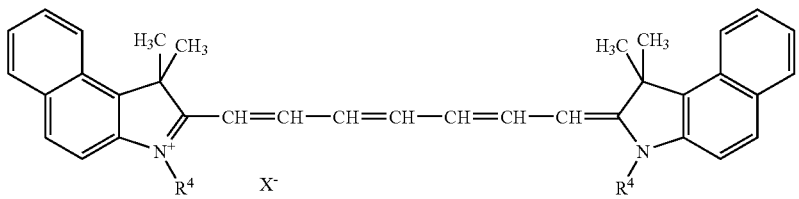
|  | R⁴ | X⁻ |
|---|---|---|
| IR-14 | —CH₂(CF₂)₆CF₃ | ClO₄⁻ |
| IR-15 | —CH₂CH₂(CF₂)₅CF₃ | ClO₄⁻ |
As compounds represented by the general formula (2), the following exemplified compounds (IR-16) to (IR-19) are listed.
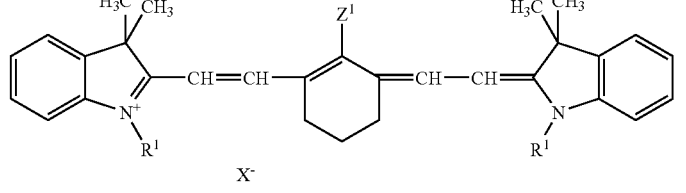
|  | R¹ | Z¹ | X⁻ |
|---|---|---|---|
| IR-16 | —CH₃ | —SCH₂CH₂(CF₂)₅CF₃ | ClO₄⁻ |
| IR-17 | —CH₃ | —NH CH₂(CF₂)₆CF₃ | ClO₄⁻ |

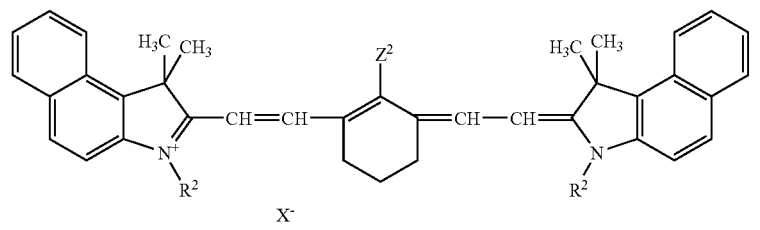

| | R² | Z² | X⁻ |
|---|---|---|---|
| IR-18 | —CH₃ | —SCH₂CH₂(CF₂)₅CF₃ | H₃C—C₆H₄—SO₃⁻ |
| IR-19 | —CH₃ | —SCH₂CH₂(CF₂)₅CF₃ | ClO₄⁻ |

As compounds represented by the general formula (3), the following exemplified compounds (IR-20) to (IR-24) are listed.

| | R⁵ | R⁶ | X⁻ |
|---|---|---|---|
| IR-20 | —CH₂CH₂OCO(CF₂)₆CF₃ | —CH₂CH₃ | BF₄⁻ |
| IR-21 | —CH₂CH₂OCO(CF₂)₆CF₃ | —CH₂CH₂OCO(CF₂)₆CF₃ | ClO₄⁻ |

| | R⁷ | R⁸ | n | X⁻ |
|---|---|---|---|---|
| IR-22 | —CH₂CH₂OCO(CF₂)₆CF₃ | —CH₂CH₃ | 2 | BF₄⁻ |
| IR-23 | —CH₂CH₂OCO(CF₂)₆CF₃ | —CH₂CH₂OCO(CF₂)₆CF₃ | 2 | ClO₄⁻ |
| IR-24 | —CH₂CH₂OCO(CF₂)₆CF₃ | —CH₂CH₃ | 3 | ClO₄⁻ |

Next, the near-infrared absorber having a polymethine chain that has 5 or more carbon atoms and having an alkyl group that has 8 or more carbon atoms connected to the polymethine chain via any of nitrogen, oxygen and sulfur will be described.

As the polymethine chain, a heptamethine chain, pentamethine chain, nonamethine chain and the like are preferable from the standpoints of stability and absorption wavelength, and a heptamethine chain and pentamethine chain are particularly preferable.

Of these, infrared absorbers of the above-mentioned general formula (4) are listed as preferable examples in view of light-heat converting function and stability as an infrared absorber, but the scope of the invention is not restricted to these.

The structures of the following exemplified compounds (IR-25) to (IR-36) are shown by specifying a counter ion X⁻, since base skeletons, fluorine-containing substituents, other substituents present on chromophores, and chromophores have electric charge.

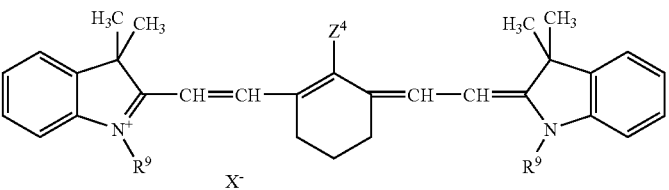

| | $R^9$ | $Z^4$ | $X^-$ |
|---|---|---|---|
| IR-25 | —CH$_3$ | —S(CH$_2$)$_{17}$CH$_3$ | ClO$_4^-$ |
| IR-26 | —CH$_3$ | —S(CH$_2$)$_{15}$CH$_3$ | BF$_4^-$ |
| IR-27 | —CH$_2$CH$_2$CH$_3$ | —O(CH$_2$)$_{19}$CH$_3$ | ClO$_4^-$ |
| IR-28 | —CH$_3$ | —NH(CH$_2$)$_{17}$CH$_3$ | ClO$_4^-$ |

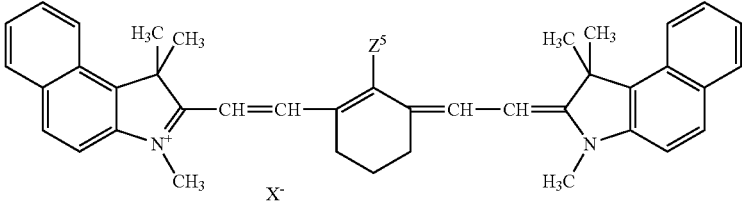

| | $Z^5$ | $X^-$ |
|---|---|---|
| IR-29 | —S(CH$_2$)$_{17}$CH$_3$ |  |
| IR-30 | —O(CH$_2$)$_{19}$CH$_3$ | ClO$_4^-$ |
| IR-31 | —NH(CH$_2$)$_{17}$CH$_3$ | ClO$_4^-$ |

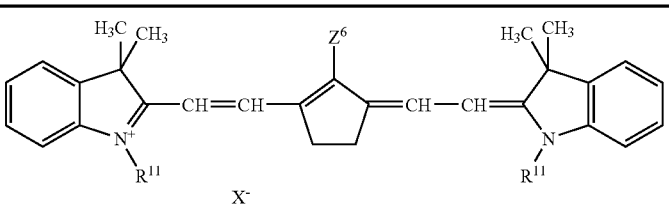

| | $R^{11}$ | $Z^6$ | $X^-$ |
|---|---|---|---|
| IR-32 | —CH$_3$ | —S(CH)$_{17}$CH$_3$ |  |
| IR-33 | —CH$_3$ | —S(CH)$_{17}$CH$_3$ | ClO$_4^-$ |
| IR-34 | —CH$_2$CH$_2$CH$_3$ | —NH(CH$_2$)$_{17}$CH$_3$ | ClO$_4^-$ |

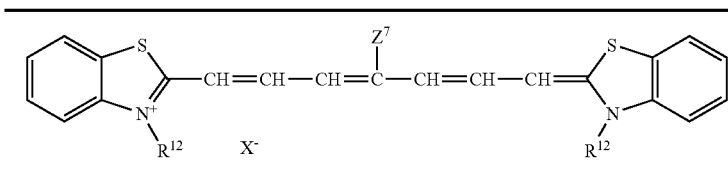

| | $R^{12}$ | $Z^7$ | $X^-$ |
|---|---|---|---|
| IR-35 | —CH$_3$ | —S(CH)$_{17}$CH$_3$ |  |
| IR-36 | —CH$_3$ | —S(CH)$_{17}$CH$_3$ | ClO$_4^-$ |

As the infrared absorption agent which can be suitably used in the image-formation material of the present invention, the following exemplified compounds (IR-37) to (IR-42) having an alkyl group having 8 or more carbon atoms outside the polymethine chain are also listed.

IR-37

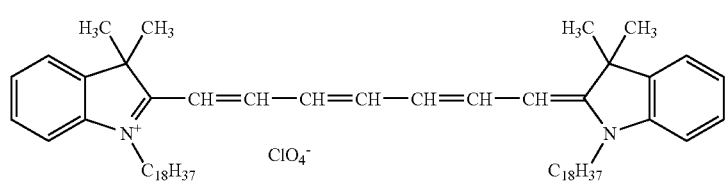

IR-38

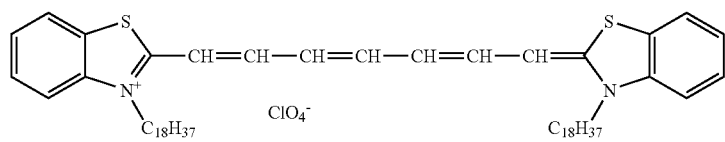

UR-39

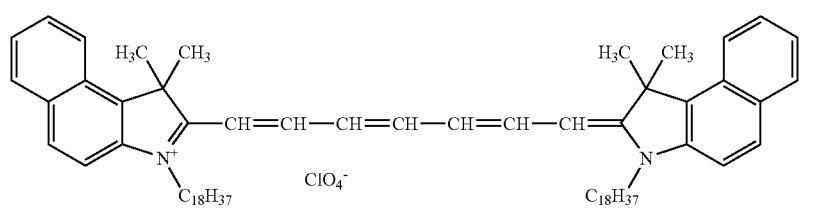

IR-40

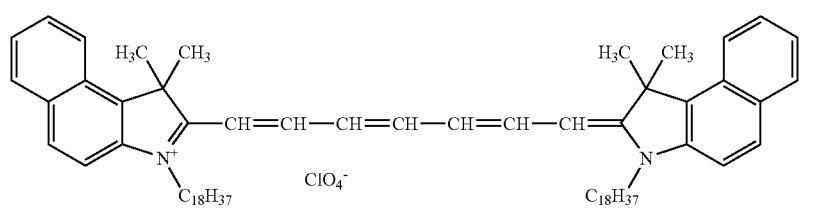

IR-41

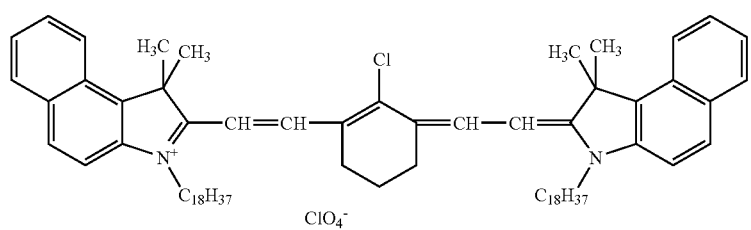

IR-42

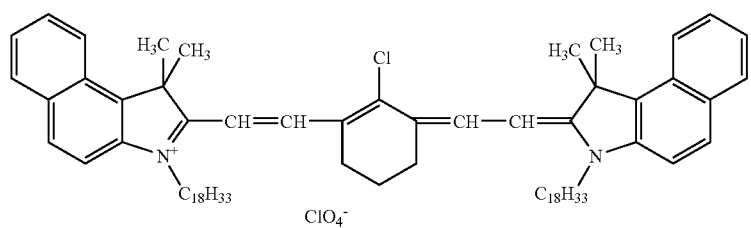

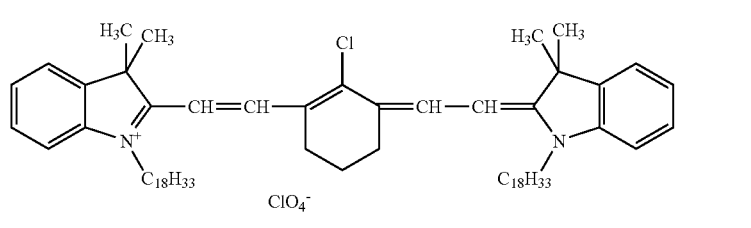

Next, a method of producing the infrared absorption agent as described above will be described.

Infrared absorption agents of the above-mentioned general formulae (1) to (4) can be produced by a known organic synthesis technology. Specifically, they can be synthesized by synthetic methods described in U.S. Pat. No. 5,441,866, Zh. Org. Khim. vol. 28 (No. 10) pp. 2156 to 2164 (1992), EP No. 465,543 A1, J. Org. Chem. (Journal of Organic Chemistry) vol. 57 (No. 17) pp. 4578 to 4580 (1992), Japanese Patent Registration No. 2758136, Justus Liebigs Ann. Chem, vol. 623, pp. 204 to 216 (1959), Ukr. Khim. Zh. vol. 22, pp. 347 to 348 (1956), Chem. Heterocycl. Comp. vol. 18, pp. 334 to 336 (1982), J. Heterocycl. Chem. vol. 25, pp. 1321 to 1325 (1988), Japanese Patent Application Laid-Open (JP-A) No. 60-231766, and the like.

The infrared absorption agent may be added to an image-formation material, and may then be added together with other components into an image-formation layer. Alternatively, when a layer other than a recording layer is provided, in producing a planographic printing plate, the infrared absorption agent may be added into this layer. These infrared absorption agents may be added alone or in a mixture of two or more.

In the present invention, these infrared absorption agents can be added in a ratio of from 0.01 to 50 wt %, preferably from 0.1 to 20 wt %, and more preferably from 0.5 to 15 wt %, based on the total weight of solid components that form the image-formation layer of the image-formation material. If the addition amount is less than 0.01 wt %, the image-forming property thereof will deteriorate, and if added in an amount of over 50 wt %, there is a risk of occurrence of staining at non-image portions in the case of use for a recording layer of a planographic printing plate.

To the image-formation material of the present invention, in addition to this infrared absorption agent, other pigments or dyes having infrared absorbing property can be added for the purpose of the improving image-forming property.

As a pigment, commercially available pigments, and pigments described in Color Index (C.I.) manual, "Saishin Ganryo Binran" ("Current Pigment Manual", edited by Nippon Ganryo Gijutsu Kyokai, 1977), "Saishin Ganryo Oyo Gijutsu" ("Current Pigment Application Technology", published by CMC, 1986), "Insatsu Inki Gijutsu" ("Printing Ink Technology", published by CMC, 1984) can be utilized.

As the pigments, black pigments, yellow pigments, orange pigments, brown pigments, red pigments, violet pigments, blue pigments, green pigments, fluorescent pigments, metal powder pigments, and additionally, polymer bond pigments, are listed. Specifically, insoluble azo pigments, azolake pigments, condensed azo pigments, chelate azo pigments, phthalocyanine-based pigments, anthraquinone-based pigments, perylene and perynone-based pigments, thioindigo-based pigments, quinacridone-based pigments, dioxazine-based pigments, isoindolinone-based pigments, quinophthalone-based pigments, dyeing lake pigments, azine pigments, nitroso pigments, nitro pigments, natural pigments, fluorescent pigments, inorganic pigments, carbon black and the like can be used.

These pigments may be used without surface treatment, or may be surface-treated before use. As a method of surface treatment, a method of surface coating with a resin or wax, a method of adhering a surfactant, a method of bonding a reactive substance (for example, a silane coupling agent, epoxy compound, polyisocyanate or the like) to the surface of the pigment, and the like are envisaged. The above-mentioned surface treatment methods are described in "Kinzoku Sekken no Seishitsu to Oyo" ("Nature and Applications of Metal Soaps", Sachi Publication), "Insatsu Inki Gijutsu" ("Printing Ink Technology", published by CMC, 1984), and "Saishin Ganryo Oyo Gijutsu" ("Current Pigment Application Technology", published by CMC, 1986).

The particle size of the pigment is preferably from 0.01 µm to 10 µm, further preferably from 0.05 µm to 1 µm, and particularly preferably from 0.1 µm to 1 µm. A particle size of the pigment of less than 0.01 µm is not preferable from the standpoint of instability of a dispersed substance in a coating solution for an image photosensing layer, and a particle size of over 10 µm is not preferable from the standpoint of uniformity of the image photosensing layer.

As a method of dispersing a pigment, known dispersing technologies used in production of ink, production of toners, and the like can be used. As a dispersing machine, an ultrasonic disperser, sand mill, attritor, pearl mill, super mill, ball mill, impeller, disperser, KD mill, colloid mill, Dynatron, triple screw roll mill, press kneader and the like are listed. Details are described in "Saishin Ganryo Oyo Gijutsu" ("Current Pigment Application Technology", published by CMC, 1986).

As a dye, commercially available dyes and, known materials described in the literature such as, for example, "Dye Manual" (edited by Yuki Gosei Kagaku Kyokai, 1960) and the like can be used. Specifically, dyes such as azo dyes, metal complex salt azo dyes, pyrazoloneazo dyes, anthraquinone dyes, phthalocyanine dyes, carbonium dyes, quinoneimine dyes, methine dyes, cyanine dyes, diimmonium dyes, aminium dyes and the like are listed.

In the present invention, among these pigments and dyes, those which absorb infrared light or near-infrared light are particularly preferable since they are suitable for use with lasers that emit infrared light or near-infrared light.

As pigments that absorb infrared light or near-infrared light, carbon black is suitably used. As a dye that absorbs infrared light or near-infrared light, for example, cyanine dyes described in JP-A Nos. 58-125246, 59-84356, 59-202829, 60-78787 and the like, methine dyes described in JP-A Nos. 58-173696, 58-181690 and 58-194595 and the like, naphthoquinone dyes described in JP-A Nos. 58-112793, 58-224793, 59-48187, 59-73996, 60-52940, 60-63744 and the like, squarylium dyes described in JP-A No. 58-112792 and the like, cyanine dyes described in British Patent No. 434,875, and dihydroperimidine squarylium dyes described in U.S. Pat. No. 5,380,635, etc. are listed.

Further, as the dye, near-infrared absorbing sensitizers described in U.S. Pat. No. 5,156,938 can also be used suitably, and particularly preferably used are arylbenzo(thio)pyrylium salts described in U.S. Pat. No. 3,881,924, trimethinethiapyrylium salts described in JP-A No. 57-142645 (U.S. Pat. No. 4,327,169), pyrylium-based compounds described in JP-A Nos. 58-181051, 58-220143, 59-41363, 59-84248, 59-84249, 59-146063 and 59-146061, cyanine dyes described in JP-A No. 59-216146, pentamethinethiopyrylium salts and the like described in U.S. Pat. No. 4,283, 475, pyrylium compounds described in JP-B Nos. 5-13514 and 5-19702, Epolight III-178, Epolight III-130, Epolight III-125, Epolight IV-62A, and the like.

Further, as other examples particularly preferable as dyes, near-infrared absorption dyes of formulae (I) and (II) described in U.S. Pat. No. 4,756,993 are listed.

Since these pigments or dyes are used together with the above-mentioned specific infrared absorption agent, the addition amount when added is preferably from about 0.01 to 20 wt % based on the total amount of solid components constituting the image-formation layer. In the case of a dye, the addition amount is particularly preferably from 0.5 to 10 wt %, and in the case of a pigment, the addition amount is particularly preferably from 0.1 to 5 wt %. If the addition amount of the pigment or dye is less than 0.01 wt %, the effect of addition is not observable, and if over 20 wt %, there is a risk of an undesirable influence on the effect of increased sensitivity that is to be provided by the above-mentioned specific infrared absorption agent.

As other components of the image-formation material of the present invention, various known image-formation materials which can be recorded by radiation in the infrared range can be appropriately selected for use.

First, a recording layer of which solubility in an alkaline aqueous solution is changed by exposure with infrared light will be described. Such recording layers are classified into negative-type layers, in which alkali-developing property is decreased by exposure to infrared light, and positive-type layers, in which developing property increases instead.

As a negative-type recording layer, known negative-type polar-conversion material-based (changing between hydrophilicity and hydrophobicity), radical polymerization-based and acid catalyst crosslinking-based (including cation polymerization) recording layers are listed. Among these, radical polymerization-based and acid catalyst crosslinking-based layers are particularly preferable from the standpoint of printing endurance. In these layers, a radical or acid generated by irradiation or heating acts as an initiator or catalyst, and compounds constituting the recording layer cause a polymerization reaction or crosslinking reaction, and cure, forming image portions.

As a positive-type recording layer, known positive-type polar-conversion material-based (changing between hydrophobicity and hydrophilicity), acid catalyst decomposition-based and interaction release-based (heat-sensitive positive) recording layers are listed. Among these, particularly, positive-type polar conversion material-based layers obtained by thermal decomposition of sulfonate esters, and acid catalyst decomposition-based and interaction release-based layers are preferable from the standpoint of image quality. In these layers, by acid or heat energy generated by irradiation or heating, a bond of a polymer compound forming a layer is released or the like, leading to water-solubility or alkaline water-solubility, and such portions can be removed by development to form non-image portions. In any image-formation layer, a polymer compound which is insoluble in water and soluble in an alkaline aqueous solution is preferably contained as a layer constituent component, that is, as a binder.

Next, image-formation layers are classified by image formation mechanism and described in detail.

<Radical Polymerization Layer>

The radical polymerization layer which can be used in the image-formation material of the present invention contains a compound that generates a radical due to light or heat (hereinafter, referred to as a radical generator) and a compound which can be radical-polymerized (referred to as a polymerizable compound). For example, a radical is generated from a radical generator in an exposed portion by irradiation with an infrared laser or the like, and this radical acts as an initiator. Consequently, the polymerizable compound is cured by a radical polymerization reaction, to form an image portion. The combination of a radical generator and polymerizable compound to be used herein can be appropriately selected for use, providing the strength of a film formed by radical polymerization satisfies the requirements of a recording layer. Further, for improvement of reactivity of the radical generator, promoters such as onium salts, reducing agents and the like can also be used together therewith. As components which can be used in a radical polymerization layer, for example, compounds described as constituent components of a heat polymerizable recording layer in JP-A No. 8-108621, compounds described as constituent components of a recording layer in JP-A No. 9-34110, and the like can also be preferably used.

(Radical Generator)

As the radical generator used in the radical polymerization layer, known radical polymerization initiators used in a polymer synthesis reaction for radical polymerization can be usually used without specific restriction. There are exemplified azobisnitrile-based compounds such as 2,2'-azobisisobutyronitrile, 2,2'-azobispropionitrile and the like; organic peroxides such as benzoyl peroxide, lauroyl peroxide, acetyl peroxide, t-butyl perbenzoate, α-cumyl hydroperoxide, di-t-butyl peroxide, diisopropyl peroxy dicarbonate, t-butyl peroxy isopropyl carbonate, peracids, alkyl peroxy carbamates, nitrosoarylacylamines and the like; inorganic peroxides such as potassium persulfate, ammonium persulfate, potassium perchlorate and the like; azo or diazo-based compounds such as diazoaminobenzene, p-nitrobenzenediazonium, azobis-substituted alkanes, diazothioethers, arylazosulfones and the like; tetraalkylthiuram disulfides such as nitrosophenylurea, tetramethylthiuram disulfide and the like; diaryl disulfides such as dibenzoyl disulfide and the like; dialkylxanthogenic disulfides, arylsulfines, arylalkylsulfones, 1-alkanesulfines and the like.

When the image-formation material of the present invention is recorded on with an infrared laser, sufficient sensitivity can be obtained even with a radical generator having a large activation energy, since the temperature of the exposed surface may reach as high as 600° C. or more, depending on laser energy.

The activation energy for generating the radical from the radical generator is preferably 30 kcal/mol or more, and as compounds manifesting such energy, azobisnitrile-based compounds and organic peroxides are listed. Among these, preferable are compounds having excellent stability at ambient temperature, manifesting high decomposing speed in overheating, and becoming colorless in decomposing, and benzoyl peroxide, 2,2'-azobisisobutyronitrile and the like are listed.

The above-mentioned radical generators may be used alone or in a combination of two or more, and are used in an amount of from about 0.5 to 30 wt %, preferably from 2 to 10 wt % based on the total weight of solid components in a radical polymerization layer.

Further, compounds that generate a radical by interaction with an onium salt described later can also be suitably used. Specifically, halogen compounds (α-haloacetophenones, trichloromethyltriazines and the like), azo compounds, aromatic carbonyl compounds (benzoin esters, ketals, acetophonones, o-acyloxyiminoketones, acylphosphine oxides and the like), hexaarylbisimidazole compounds, peroxides and the like are listed, and preferably listed are bisimidazole derivatives disclosed as (A-1) to (A-4) in the above-mentioned JP-A No. 9-34110, page 16.

The latter radical generator attains high sensitivity by interaction with an onium salt. As the onium salt which can be used together with this radical generator, phosphonium salts, sulfonium salts, iodonium salts and ammonium salts described in the same publication, paragraph Nos. [0022] to [0049] are listed.

The amount of the above-mentioned onium salt added is preferably from 0.05 to 50% by weight based on the total weight of solid components in the recording layer, although this may vary depending on the kind and used form of the onium salt.

Further, onium salts such as iodonium salts, sulfonium salts, phophonium salts, diazonium salts and the like which can be suitably used as an acid generator in <Acid crosslinking agents> described later can be used alone as a radical generator without combination with the above-mentioned radical generator, and an addition amount thereof is preferably from 0.05 to 50% by weight based on the total weight of solid components in a recording layer, although this may vary depending on the kind and used form.

(Polymerizable Compound)

As the polymerizable polymer compound which is polymerized to be cured by the radical generated by the radical generator, known monomers having a polymerizable group can be used without specific restriction. As such monomers, there are specifically exemplified: mono-functional acrylates such as 2-ethylhexyl acrylate, 2-hydroxyethyl acrylate, 2-hydroxypropyl acrylate and the like and derivatives thereof, or compounds obtained by substituting acrylate in these compounds with methacrylate, itaconate, crotonate, maleate and the like; bifunctional acrylates such as polyethylene glycol diacrylate, pentaerythritol diacrylate, bisphenol A diacrylate, diacrylate of ε-caprolactone adduct of hydroxypivalic acid neopentyl glycol, and the like, and derivatives thereof, or compounds likewise obtained by substituting acrylate in these compounds with methacrylate, and the like;

polyfunctional acrylates such as trimethylolpropane tri (meth)acrylate, dipentaerythritol pentaacrylate, dipentaerythritol hexaacrylate, pyrogallol triacrylate and the like and derivatives thereof, or compounds obtained by substituting acrylate in these compounds with methacrylate, and the like. Further, so-called prepolymers which are obtained by introducing an acrylic acid or methacrylic acid into an oligomer having suitable molecular weight and are endowed with a light polymerization property can also be suitably used.

In addition to these, compounds described in JP-A Nos. 58-212994, 61-6649, 62-46688, 62-48589, 62-173295, 62-187092, 63-67189, 1-244891 and the like, and other compounds are listed. Further, compounds described in "11290 Chemical Products", Kagaku Kogyo Nippo Sha, pp. 286 to 294, compounds descried in "UV EB curing Hand Book" (raw materials chapter) Kobunshi Kanko Kai, pp. 11 to 65, and other compounds can also be suitably used.

Among these, compounds having two or more acrylic groups or methacrylic groups in the molecule are preferable in the present invention. Further, those having a molecular weight of 10,000 or less, more preferably 5,000 or less, are desirable. In the present invention, the polymerizable compounds are selected from monomers and prepolymers having a polymerizable group, including also the above exemplified compounds, and can be used alone, or in a combination of two or more provided there is no problem in compatibility and affinity, according to objectives.

A compound having an ethylenically-unsaturated group is contained in an amount preferably from 20 to 80 wt %, more preferably from 30 to 60 wt % in terms of solid components in the radical polymerization layer.

(Binder Resin)

In the recording layer, a binder resin is used, if necessary. As the binder resin, polyester-based resins, polyvinylacetal-based resins, polyurethane-based resins, polyamide-based resins, cellulose-based resins, olefin-based resins, vinyl chloride-based resins, (meth)acrylic acid-based resins, styrene-based resins, polycarbonate, polyvinyl alcohol, polyvinylpyrrolidone, polysulfone, polycaprolactone resins, polyacrylonitrile resin, urea resins, epoxy resins, phenoxy resins, rubber-based resins and the like are listed. Further, resins having an unsaturated bond in the resin, for example, diallylphthalate resins and derivatives thereof, polypropylene chloride and the like, can be suitably used according to use, because they can be polymerized with the above-mentioned compound having an ethylenically-unsaturated bond. As a binder resin, one resin selected from the above-mentioned resins, or two or more such resins in combination, can be used.

It is preferable to use these binder resins in an amount of 500 parts by weight or less, more preferably 200 parts by weight or less, for 100 parts by weight of the polymerizable compound.

An increase in sensitivity and promotion of the radical polymerization reaction can be realized by adding the above-mentioned specific infrared absorption agent to such a radical polymerization layer.

(Other Compounds)

In the radical polymerization layer, various additives used together with conventionally known light-polymerizable compounds can be appropriately used in an amount which does not detract from the effect of the present invention.

As these additives, heat polymerization inhibitors are listed. Specific examples thereof include quinone-based and phenol-based compounds such as hydroquinone, pyrogallol, p-methoxyphenol, catechol, β-naphthol, 2,6-di-t-butyl-p-cresol and the like, and these compounds are used in an amount of 10 parts by weight, preferably from 0.01 to 5 parts by weight for 100 parts by weight of the total amount of the polymerizable compound having an ethylenically unsaturated bond and the binder resin.

As a compound which can be added as an oxygen quencher, N,N-dialkylaniline derivatives such as compounds described in U.S. Pat. No. 4,772,541, column 11, line 58 to column 12, line 35, and the like are listed.

Further, for improving film quality, plasticizers can be used. Examples include exemplified phthalates, trimellitates, adipates, other saturated or unsaturated carboxylates, citrates, epoxidated soy bean oil, epoxidated linseed oil, stearic epoxys, orthophosphates, phosphates, glycol esters and the like.

As an additive for generating an acid and promoting decomposition of the radical generator during heating, co-use of an acid generator is also preferable. As this acid generator, those described in detail in explanation of the acid crosslinking layer, described below, can be used.

The above-mentioned components can be selected appropriately, dissolved in a suitable solvent, and applied on the substrate to form the radical polymerization layer, and the amount applied is preferably from about 0.01 to 5.0 g/m$^2$ after drying.

When the radical polymerization layer is used as a recording layer, an overcoating layer which manifests oxygen impermeability may also be provided adjacent to the radical polymerization layer, for preventing polymerization inhibition by oxygen. As the raw material of the overcoating layer, water-soluble resins such as polyvinyl alcohol, carboxymethylcellulose, hydroxyethylcellulose, methylcellulose, polyvinylpyrrolidone and the like are preferable, and the film thickness thereof is suitably from about 0.2 to 3 μm.

A dye or pigment which does not absorb light from a light source used for recording may be added to the overcoating layer as a filter agent, if necessary.

<Acid Crosslinking Layer>

The acid crosslinking layer in the present invention contains a compound which generates an acid due to light or heat (hereinafter, referred to as an acid generator) and a compound which can crosslink using the generated acid as a catalyst (hereinafter, referred to as a crosslinking agent) and, further, a binder polymer which can react with the crosslinking agent in the presence of the acid, for forming the layer containing these compounds. In this acid crosslinking layer, acid generated by decomposition of the acid generator when irradiated with light or heat promotes action of the crosslinking agent, and a strong crosslinking structure is formed between crosslinking agents or between the crosslinking agent and a binder polymer. Resultantly, alkali-solubility decreases, leading to insolubility in a developing agent.

As the acid crosslinking agent layer having such a property, known layers having the same property can be used. For example, there are listed layers composed of a radiation-sensitive composition containing a resol resin, novolak resin, latent Brønsted acid, and infrared absorption agent. Here, "latent Brønsted acid" indicates a precursor which is decomposed to form a Brønsted acid, and is a compound having properties of both the acid generator and the acid crosslinking agent in the present invention. A Brønsted acid is believed to catalyze a matrix-formation reaction between a resol resin and a novolak resin. As Brønsted acids suitable for this purpose, trifluoromethanesulfonic acid and hexafluorophosphonic acid are exemplified.

Further, ionic latent Brønsted acids are preferable. Examples thereof include onium salts, particularly, iodonium, sulfonium, phosphonium, selenonium, diazonium and arsonium salts. Nonionic latent Brønsted acids can also be suitably used, and the following compounds: $RCH_2X$, $RCHX_2$, $RCX_3$, $R(CH_2X)_2$ and $R(CH_2X)_3$ (wherein, X represents Cl, Br, F, $CF_3$, or $SO_3$, and R represents an aromatic group, an aliphatic group or a bonded body of an aromatic group and an aliphatic group) are listed.

Furthermore, a recording layer containing an acid-crosslinkable compound described in JP-A 11-95415 and a binding agent having high molecular weight are also listed as suitable examples. This is a photosensitive layer containing: a compound which can generate an acid when irradiated with an active beam, for example, salts of diazonium, phosphonium, sulfonium, iodonium and the like, organic halogen compounds, orthoquinone-diazidesulfonyl chloride, and organic metal/organic halogen compounds; and a compound having at least one bond which can crosslink in the presence of the above-mentioned acid, for example, an amino compound having at least two of alkoxymethyl groups, methylol groups, acetoxymethyl groups and the like as functional groups, at least two-substituted aromatic compounds having an alkoxy methyl group, methylol group, acetoxymethyl group or the like as a functional group, resol resins and furan resins, acrylic resins synthesized from specific monomers, and the like.

The acid crosslinking layer of the present invention contains an acid generator, crosslinking agent and binder polymer, and other components. Next, these compounds will be illustrated.

(Acid Generator)

In the present invention, the compound which generates acid due to light or heat (acid generator) refers to a compound which is decomposed to generate acid by irradiation with infrared light or heating to 100° C. or more.

As the acid generated, a strong acid having a pKa of 2 or less, such as sulfonic acid, hydrochloric acid and the like, is preferable.

As the acid generator suitably used in the present invention, onium salts such as iodonium salts, sulfonium salts, phosphonium salts, diazonium salts and the like are listed. Specifically, compounds described in U.S. Pat. No. 4,708,925 and JP-A No. 7-20629 are listed. Particularly, iodonium salts, sulfonium salts and diazonium salts containing a sulfonate ion as a counter ion are preferable. As the diazonium salt, diazonium compounds described in U.S. Pat. No. 3,867,147, diazonium compounds described in U.S. Pat. No. 2,632,703 and diazo resins described in JP-A Nos. 1-102456 and 1-102457 are also preferable. Benzyl sulfonates described in U.S. Pat. Nos. 5,135,838 and 5,200,544 are also preferable. Further, active sulfonates and disulfonyl compounds described in JP-A Nos. 2-100054, 2-100055 and 8-9444 are also preferable. Additionally, s-triazines substituted with a halo alkyl, described in JP-A No. 7-271029 are also preferable.

These acid generators are added into an acid crosslinking layer in a proportion of from 0.01 to 50% by weight based on the total weight of solid components in the acid crosslinking layer, preferably from 0.1 to 40% by weight, and more preferably from 0.5 to 30% by weight. If the addition amount is less than 0.01% by weight, an image may not be obtained. If the addition amount is over 50% by weight, staining may occur at non-image parts in printing.

These compounds may be used alone or in a combination of two or more. Since the acid generators listed above can be decomposed also by irradiation with ultraviolet light, if a recording layer having such a form is used, an image can be recorded not only by irradiation with infrared light but also by irradiation with ultraviolet light.

(Crosslinking Agent)

The crosslinking agent which can be used in the acid crosslinking layer of the present invention is not particularly restricted providing it is a compound which can be crosslinked by action of an acid, and preferably used are phenol derivatives of the following general formula (5) (hereinafter, referred to as a low molecule phenol derivatives, as appropriate), poly-nuclear type phenolic crosslinking agents having in the molecule thereof three or more phenol rings which have two or three hydroxymethyl groups on the rings, of the following general formula (6), and mixtures of the above-mentioned low molecule phenol derivative with the poly-nuclear type phenolic crosslinking agent and/or a resol resin, and the like.

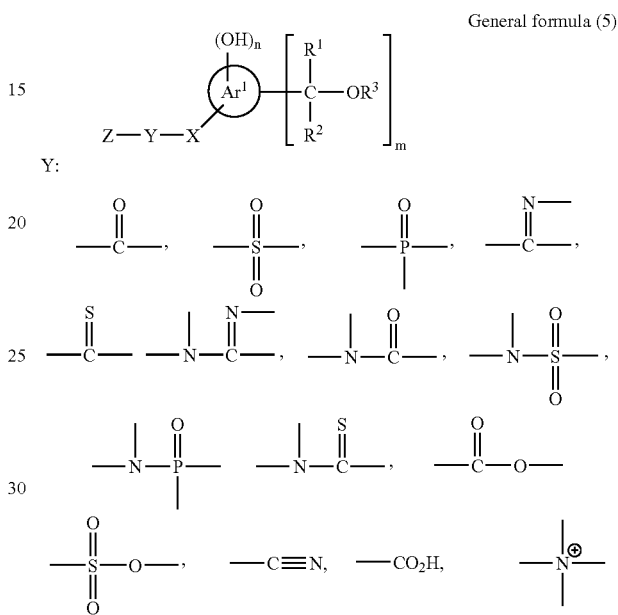

General formula (5)

In this formula, $Ar^1$ represents an aromatic hydrocarbon ring optionally having a substituent. $R^1$ and $R^2$ may be the same or different. $R^3$ represents a hydrogen atom or a hydrocarbon group having 12 or less carbon atoms. m represents an-integer from 2 to 4. n represents an integer from 1 to 3. X represents a divalent connecting group. Y represents a mono-valent to tetra-valent connecting group having the above-mentioned partial structure, or a functional group carrying a hydrogen atom at an end. Z is not present if Y is an end group, or represents a mono-valent to tetra-valent connecting group or functional groups present depending on the number of connecting groups of Y.

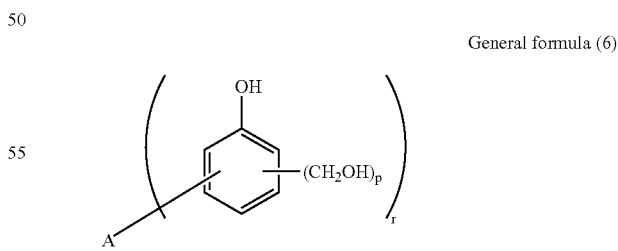

General formula (6)

In this formula, A represents an r-valent hydrocarbon connecting group having 1 to 20 carbon atoms, and r represents an integer from 3 to 20. p represents an integer from 2 to 3.

Phenol derivatives of the general formula (5) are described in detail in Japanese Patent Application No. 11-352210, paragraph nos. [0098] to [0155], submitted by the present applicant. Poly-nuclear type phenolic crosslinking agents having in the molecule three or more phenol rings having 2 or 3 hydroxymethyl groups on the rings, of the general formula (6), are also described in detail in the same specification, in paragraph nos. [0156] to [0165].

These crosslinking agents may be used alone or in a combination of two or more.

In the present invention, the crosslinking agent is used in an addition amount of from 5 to 70% by weight, preferably from 10 to 65% by weight based on the total weight of solid components in the acid crosslinking layer. If the addition amount of the crosslinking, agent is less than 5% by weight, the film strength of an image part when an image is recorded will deteriorate, and if over 70% by weight, stability in storage will not be preferable.

As the binder polymer which can be used in the acid crosslinking layer of the present invention, polymers having on a side chain or main chain an aromatic hydrocarbon ring to which a hydroxyl group or alkoxy group is directly bonded are listed. As the alkoxy group, those having 20 or less carbon atoms are preferable from the standpoint of sensitivity. As the aromatic hydrocarbon ring, a benzene ring, naphthalene ring or anthracene ring is preferable from the standpoint of availability of raw materials. These aromatic hydrocarbon rings may have other substituents than the hydroxyl group or alkoxy group, for example, substituents such as halogen groups, cyano groups and the like. However, from the standpoint of sensitivity, it is preferable that the aromatic hydrocarbon group has no other substituent than the hydroxyl group or alkoxy group.

In the present invention, a binder polymer which can be suitably used is a polymer having a constituent unit of the following general formula (7), or a phenol resin such as a novolak resin or the like.

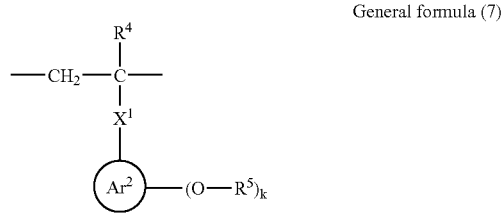

General formula (7)

In this formula, $Ar^2$ represents a benzene ring, naphthalene ring or anthracene ring. $R^4$ represents a hydrogen atom or methyl group. $R^5$ represents a hydrogen atom or alkoxy group having 20 or less carbon atoms. $X^1$ represents a single bond, or a di-valent connecting group having 0 to 20 carbon atoms and containing one or more atoms selected from C, H, N, O and S. k represents an integer from 1 to 4.

In the present invention, though a homopolymer composed solely of a constituent unit of the general formula (7) may be used as the binder polymer, a copolymer having a constituent unit derived from another known monomer together with this specific constituent unit may also be used.

The proportion of the constituent unit of the general formula (7) contained in the copolymer obtained therefrom is preferably from 50 to 100% by weight, and further preferably from 60 to 100% by weight.

The polymer used in the present invention has a weight-average molecular weight of preferably 5,000 or more, further preferably from 10,000 to 300,000, and a number-average molecular weight of preferably 1,000 or more, further preferably from 2,000 to 250,000. The degree of polydispersity (weight-average molecular weight/number-average molecular weight) is preferably 1 or more, and further preferably from 1.1 to 10.

These polymers may be any of a random polymer, block polymer, graft polymer and the like, and a random polymer is preferable.

Next, the novolaks will be described. As a novolak resin suitably used in the present invention, phenol novolaks, o-, m- and p-cresol novolaks, and copolymers thereof, and novolaks obtained by utilizing phenols substituted with a halogen atom, alkyl group or the like, are listed.

The novolak resin has a weight-average molecular weight of preferably 1,000 or more, further preferably from 2,000 to 20,000, and a number-average molecular weight of preferably 1,000 or more, further preferably from 2,000 to 15,000. The degree of polydispersity is preferably 1 or more, and further preferably from 1.1 to 10.

Use of a polymer having a heterocyclic ring that has an unsaturated bond in the ring as the binder polymer is also a preferable embodiment.

Here, the heterocyclic ring means a ring containing one or more heteroatoms other than carbon, as atoms constituting the ring system. As heteroatoms used, nitrogen atoms, oxygen atoms, sulfur atoms and silicon atoms are preferable. It is believed that by use of a polymer having such a heterocyclic group, a reaction tends to occur chemical-structurally, due to function of a lone pair existing in this heterocyclic ring, to thereby form a film having excellent printing endurance.

The binder polymer as described above used in the present invention may be used alone or in a combination of two or more. This polymer is added in a proportion of from 20 to 95% by weight based on the total weight of solid components in an acid crosslinking layer, and preferably from 40 to 90% by weight. If the addition amount is less than 20% by weight, strength of image parts will be deficient when images are formed. On the other hand, if the addition amount is over 95% by weight, images will not be formed.

Also, in this acid crosslinking layer, sensitivity can be improved by inclusion of the infrared absorption agent.

In forming this acid crosslinking layer, various additives such as a surfactant and the like can be used therewith for purposes of improving applicability and film quality and the like.

As the positive recording layer, interaction releasing systems (heat sensitive positive), acid catalyst decomposition systems, and polarity-conversion systems are listed. These are described below in this order.

<Interaction Releasing System (Heat Sensitive Positive)>

The interaction releasing system is constituted of a water-insoluble polymer, an alkaline water-soluble polymer, and an infrared absorption agent.

Now, the alkali-soluble polymer compound which can be used in a positive recording layer includes homopolymers containing an acidic group on the main chain and/or side chain of the polymer, copolymers thereof, and mixtures thereof.

Among these, those having an acidic group exemplified in the following (1) to (6) on the main chain and/or side chain of the polymer are preferable from the standpoint of solubility in an alkaline developing solution, and from the standpoint of manifestation of dissolution-suppressing ability.

(1) Phenol group (—Ar—OH)
(2) Sulfonamide group (—SO₂NH—R)

(3) Substituted sulfonamide-based acid group (hereinafter, referred to as "active imide group") [—SO$_2$NHCOR, —SO$_2$NHSO$_2$R, —CONHSO$_2$R]

(4) Carboxyl group (—CO$_2$H)

(5) Sulfonic group (—SO$_3$H)

(6) Phosphoric group (—OPO$_3$H$_2$)

In the above (1) to (6), Ar represents a di-valent aryl connecting group optionally having a substituent, and R represents a hydrocarbon group optionally having a substituent.

Among alkaline water-soluble polymers having an acidic group selected from the above-mentioned (1) to (6), alkaline water-soluble polymers having (1) a phenol group, (2) a sulfonamide group and (3) an active imide group are most preferable from the standpoints of solubility in the alkaline developing solution, developing latitude, and sufficient ensuring of film strength.

As alkaline water-soluble polymers having an acidic group selected from the above-mentioned (1) to (6), the following polymers are exemplified.

(1) As an alkaline water-soluble polymer having a phenol group, for example, novolak resins such as polycondensates of phenol with formaldehyde; polycondensates of m-cresol with formaldehyde; polycondensates of p-cresol with formaldehyde; polycondensates of m-/p-mixed cresol with formaldehyde; polycondensates of phenol, cresol (may be m-, p- or m-/p-mixed type) and formaldehyde, and the like; and polycondensates of pyrogallol with acetone are listed. Further, copolymers obtained by copolymerizing a compound having a phenol group on the side chain are listed. Alternatively, copolymers obtained by copolymerizing a compound having a phenol group on the side chain can also be used.

As the compound having a phenol group, acrylamides, methacrylamides, acrylates, methacrylates, hydroxystyrenes and the like are listed.

The alkaline water-soluble polymer preferably has a weight-average molecular weight from $5.0 \times 10^2$ to $2.0 \times 10^4$ and a number-average molecular weight from $2.0 \times 10^2$ to $1.0 \times 10^4$, from the standpoint of image-formation property. These polymers may be used alone, or in a combination of two or more. In the case of a combination, a polycondensate of phenol with formaldehyde having as a substituent an alkyl group having 3 to 8 carbon atoms, such as a polycondensate of t-butylphenol with formaldehyde and a polycondensate of octylphenol with formaldehyde as described in U.S. Pat. No. 4,123,279, alkaline water-soluble polymers having a phenol structure having an electron attractive group on an aromatic ring as described in Japanese Patent Application No. 11-47019 submitted previously by the present inventor, and the like may be used together.

(2) As the alkaline water-soluble polymer having a sulfonamide group, for example, polymers constituted, as the main constituent component, of a minimum constituent unit derived from a compound having a sulfonamide group are listed. As the above-mentioned compound, compounds having in the molecule one or more sulfonamide-groups in which at least one hydrogen atom is bonded to a nitrogen atom and one or more polymerizable unsaturated bonds are: listed. Among others, low molecular weight compounds having in the molecule an acryloyl group, allyl group or vinyloxy group and a substituted or mono-substituted aminosulfonyl group or a substituted sulfonylimino group are preferable. For example, compounds of the following general formulae 8 to 12 are listed.

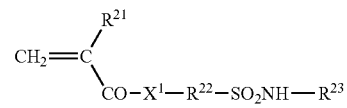
General formula (8)

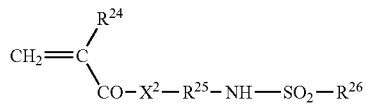
General formula (9)

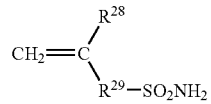
General formula (10)

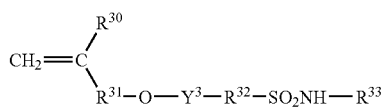
General formula (11)

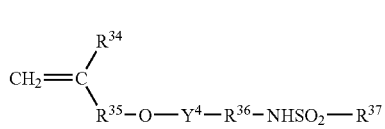
General formula (12)

In these formulae, each of $X^1$ and $X^2$ independently represents —O— or —NR$^{27}$—. Each of $R^{21}$ and $R^{24}$ independently represents a hydrogen atom or —CH$_3$. Each of $R^{22}$, $R^{25}$, $R^{29}$, $R^{32}$ and $R^{36}$ independently represents an alkylene group, a cycloalkylene group, an arylene group or an aralkylene group, having 1 to 12 carbon atoms and optionally having a substituent. Each of $R^{23}$, $R^{27}$ and $R^{33}$ independently represents a hydrogen atom or an alkyl group, a cycloalkyl group, an aryl group or an aralkyl group, having 1 to 12 carbon atoms and optionally having a substituent. Further, each of $R^{26}$ and $R^{37}$ independently represents an alkyl group, a cycloalkyl group, an aryl group or an aralkyl group, having 1 to 12 carbon atoms and optionally having a substituent. Each of $R^{28}$, $R^{30}$ and $R^{34}$ independently represents a hydrogen atom or —CH$_3$. Each of $R^{31}$ and $R^{35}$ independently represents a single bond, or an alkyl group, a cycloalkylene group, an arylene group or an aralkylene group, having 1 to 12 carbon atoms and optionally having a substituent. Each of $Y^3$ and $Y^4$ independently represents a single bond, or —CO—.

Among compounds of the general formulae 8 to 12, m-aminosulfonylphenyl methacrylate, N-(p-aminosulfonylphenyl)methacrylamide, N-(p-aminosulfonylphenyl) acrylamide and the like can be suitably used in the positive planographic printing material of the present invention.

(3) As the alkaline water-soluble polymer having an active imide group, for example, polymers constituted, as the main constituent component, of a minimum constituent unit derived from a compound having an active imide group are listed. As the above-mentioned compound, compounds having in the molecule one or more active imide groups of the following structural formula and one or more polymerizable unsaturated bonds are listed.

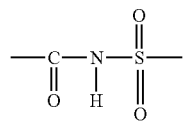

Specifically, N-(p-toluenesulfonyl)methacrylamide, N-(p-toluenesulfonyl)acrylamide and the like can be suitably used.

(4) As the alkaline water-soluble polymer having a carboxyl group, for example, polymers constituted, as the main constituent component, of a minimum constituent unit derived from a compound having in the molecule one or more carboxyl groups and one or more polymerizable unsaturated groups are listed.

(5) As the alkaline water-soluble polymer having a sulfonic group, for example, polymers constituted, as the main constituent component, of a minimum constituent unit derived from a compound having, in the molecule, one or more sulfonic groups and one or more polymerizable unsaturated groups are listed.

(6) As the alkaline water-soluble polymer having a phosphate group, for example, polymers constituted, as the main constituent component, of a minimum constituent unit derived from a compound having in the molecule one or more phosphate groups and one or more polymerizable unsaturated groups are listed.

The minimum constituent unit having an acidic group selected from the above-mentioned (1) to (6) constituting an alkaline water-soluble polymer to be used in the positive recording layer is not necessarily restricted to one kind specifically, and those obtained by copolymerizing two or more minimum constituent units having the same acidic group or two or more minimum constituent units having different acidic groups can also be used.

In the above-mentioned polymers, compounds having an acidic group selected from (1) to (6) to be copolymerized are contained in the copolymer preferably in an amount of 10 mol % or more, and more preferably 20 mol % or more. If less than 10 mol %, there is a tendency that developing latitude can not be sufficiently improved.

<Acid Catalysis Decomposition System>

A chemical amplification layer is preferably formed on an exposure surface of an uppermost layer of the recording layer, and contains, as an essential component, a compound which generates acid due to action of light or heat (acid generator), and a compound which manifests cleavage of a chemical bond using the generated acid as a catalyst, to increase solubility in the alkaline developing solution (an acid-decomposable compound).

The chemical amplification layer may further contain a polymer compound which is a binder component for forming this layer, or the above-mentioned acid-decomposable compound itself may be a polymer compound which performs the function of a binder component, or a precursor thereof.

[Acid-Decomposable Compound]

In the present invention, the compound which manifests cleavage of a chemical bond using the acid as a catalyst to increase solubility in the alkaline developing solution is, in other words, a compound having in the molecule a bonding group which can be decomposed by an acid. As such a compound, those described as "(b) compound having at least one bond decomposable by an acid" in-JP-A No. 9-171254 can be used. As the bond decomposable by an acid, for example, —(CH$_2$CH$_2$O)$_n$— groups (n represents an integer from 2 to 5) and the like are preferably listed.

Among such compounds, compounds of the following general formula (13) are preferably used from the standpoints of sensitivity and developing property.

General formula (13)

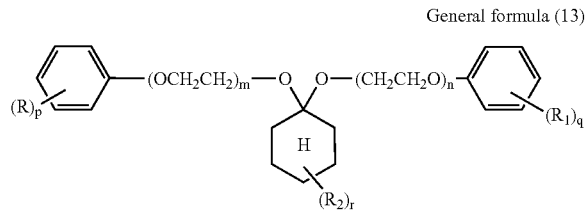

In this formula, each of R, R$^1$ and R$^2$ represents a hydrogen atom, alkyl group having 1 to 5 carbon atoms, alkoxy group having 1 to 5 carbon atoms, sulfo group, carboxyl group or hydroxyl group; each of p, q and r represents an integer from 1 to 3; and each of m and n represents an integer from 1 to 5.

In the above-mentioned general formula (13), alkyl groups represented by R, R$^1$ and R$^2$ may be linear or branched, and examples thereof include an ethyl group, propyl group, isopropyl group, butyl group, tert-butyl group, pentyl group and the like. As alkoxy groups, for example, a methoxy group, ethoxy group, propoxy group, isopropoxy-group, butoxy group, tert-butoxy group, pentoxy group and the like are listed. Sulfo groups and carboxyl groups include salts thereof. Among compounds of the general formula (13), those in which m and n are 1 or 2 are particularly preferable. Compounds of the general formula (13) can be synthesized by a known method.

In addition, as an acid-decomposable compound which can be used with the present invention, there are listed compounds having a C—O—C bond described in JP-A Nos. 48-89603, 51-120714, 53-133429, 55-12995, 55-126236 and 56-17345; compounds having a Si—O—C bond described in JP-A Nos. 60-37549 and 60-121446; and other acid-decomposable compounds described in JP-A Nos. 60-3625 and 60-10247. Further listed are compounds having a Si—N bond described in JP-A No. 62-222246, carbonates described in JP-A No.62-251743, orthocarbonates described in JP-A No. 62-209451, orthotitanates described in JP-A No. 62-280841, orthosilicates described in JP-A No. 62-280842, acetals, ketals and orthocarbonates described in JP-A Nos. 63-010153, 9-171254, 10-55067, 10-111564, 10-87733, 10-153853, 10-228102, 10-268507, 10-282648 and 10-282670, EP-0884547A1, and compounds having a C—S bond described in JP-A No. 62-244038.

Among the above-mentioned acid-decomposable compounds, particularly compounds having a C—O—C bond, compounds having a Si—O—C bond, orthocarbonates, acetals, ketals and silyl ethers described in JP-A Nos. 53-133429,56-17345, 60-121446, 60-37549,62-209451, 63-010153, 9-171254, 10-55067, 10-111564, 10-87733, 10-153853, 10-228102, 10-268507, 10-282648 and 10-282670, and EP-0884547A1 are preferable.

Among these acid-decomposable compounds, polymer compounds which have in the main chain a repeating acetal or ketal part and of which solubility in an alkaline developing solution is increased by the generated acid are preferably used.

These acid-decomposable compounds may be used alone or in a combination of two or more. Regarding the addition amount, these compounds are added into the chemical amplification layer in a proportion of from 5 to 70% by weight based on the total weight of solid components in the layer, preferably from 10 to 50% by weight, and more preferably from 15 to 35% by weight. If the addition amount is less than 5% by weight, staining of non-image parts tends to occur, and if over 70% by weight, film strength in image parts becomes insufficient. That is, both these cases are not preferable.

<Polarity-Conversion System>

A polarity-conversion material which changes from lipophilic to hydrophilic when heated is a material which varies from a state in which affinity, such as swelling or dissolution or the like, is not manifested for water at normal temperature to a state in which affinity is manifested for water. This variation may be or may not be accompanied by a chemical reaction. However, a variation accompanied by a chemical reaction is preferable since the extent of conversion of polarity is large. As such a polarity-conversion reaction, a reaction that generates a hydrophilic group by heat is exemplified. As a hydrophilic substituent, acidic groups such as a phosphonic group, sulfonic group, carboxyl group, sulfonamide, phenol and the like, a hydroxyl group, amino groups and the like, and onium salts such as an ammonium salt and the like are listed. Reactions are preferable in which such a substituent is manifested by action of heat. As such a polarity-conversion material, carboxylates described in JP-A No. 7-186562, photochromic compounds described in JP-A Nos. 9-240148, 4-44895, 8-3463 and 8-156401, inorganic compounds described in JP-A No. 51-115101, and compounds which can generate a sulfonic acid described in JP-A No. 10-282672 are listed. Further, protective groups that generate the above-mentioned hydrophilic group are also used suitably. As such protective groups, those described in "Protective Groups in Organic Synthesis" (Greene, Theodra W. and Wuts, Peter G. M., Wiley-Interscience Publication), and "Protecting Groups" (Philip J. Kocienski, George Thieme Verlag Stuttgart) are listed. These may have high molecular weight or low molecular weight.

The reaction temperature is preferably from 80° C. to 300° C., particularly preferably from 120° C. to 200° C. When the reaction temperature is lower, storage stability lowers, and when the reaction temperature is higher, sensitivity lowers.

[Other Components]

In the image-formation material of the present invention, various additives can be further added, if necessary. For example, addition of other onium salts, aromatic sulfone compounds, aromatic sulfonate compounds, poly-functional amine compounds and the like is preferable since a function to inhibit dissolution of an alkaline water-soluble polymer into a developing solution can be improved when such compounds are added.

As the above-mentioned onium salts: diazonium salts, ammonium salts, phosphonium salts, iodonium salts, sulfonium salts, selenonium salts, arsonium salts and the like are listed. The onium salt is preferably added in an amount of from 1 to 50% by weight based on the total amount of solid components constituting the image-formation material, more preferably from 5 to 30% by weight, and particularly preferably from 10 to 30% by weight.

Also, for the purpose of further improving sensitivity, cyclic acid anhydrides, phenols, and organic acids can be used together therewith. As a cyclic acid anhydride, phthalic anhydride, tetrahydrophthalic anhydride, hexahydrophthalic anhydride, 3,6-endoxy-Δ4-tetrahydro-phthalic anhydride, tetrachlorophthalic anhydride, maleic anhydride, chloromaleic anhydride, α-phenylmaleic anhydride, succinic anhydride, pyromellitic anhydride and the like described in U.S. Pat. No. 4,115,128 can be used. As a phenol, bisphenol A, p-nitrophenol, p-ethoxyphenol, 2,4,4'-trihydroxybenzophenone, 2,3,4-trihydroxybenzophenone, 4-trihydroxybenzophenone, 4,4',4"-trihydroxytriphenylmethane, 4,4',3",4"-tetrahydroxy-3,5,3',5'-tetramethyltriphenylmethane and the like are listed. Further, as an organic acid, sulfonic acids, sulfinic acids, alkylsulfuric acids, phosphonic acids, phosphates and carboxylic acids and the like described in JP-A Nos. 60-88942 and 2-96755 and the like-are listed.

The proportion of the above-mentioned cyclic acid anhydrides, phenols and organic acids present in the image-formation material is preferably from 0.05 to 20% by weight, more preferably from 0.1 to 15% by weight, and particularly preferably from 0.1 to 10% by weight.

Further, in addition to these, epoxy compounds, vinyl ethers, phenol compounds having a hydroxymethyl group and phenol compounds having an alkoxy methyl group described in JP-A No. 8-276558, and crosslinkable compounds having an alkali disolution-suppressing action described in JP-A No. 11-160860, submitted previously by the present inventor, and the like can be appropriately added, according to objectives.

Further, in the printing plate of the present invention, nonionic surfactants as described in JP-A Nos. 62-251740 and 3-208514, and ampholytic surfactants as described in JP-A Nos. 59-0121044 and 4-13149 can be added for widening processing stability under developing conditions.

In the printing plate of the present invention, a printout agent for obtaining a visible image directly after heating by exposure, and a dye or pigment as an image coloring agent can be added.

As the printout agent, there are typically listed combinations of organic dyes which can form a salt with a compound that releases an acid when heated by exposure (optical acid releasing agent); Specific examples include a combination of o-naphthoquinonediazide-4-sulfonic acid halogenide with a salt-forming organic dye described in JP-A Nos. 50-36209 and 53-8128, and a combination of a trihalomethyl group with a salt-forming organic dye described in JP-A Nos. 53-36223, 54-74728, 60-3626, 61-143748, 61-151644 and 63-58440. As such a trihalomethyl group, oxazole-based compounds and triazine-based compounds are exemplified, and both of these are excellent in stability with the lapse of time, and give a clear printout image.

As a coloring agent for an image, other dyes can be used in addition to the salt-forming organic dye described above. Oil-soluble dyes and basic dyes are listed as suitable dyes, including salt-forming organic dyes. Specifically, Oil Yellow #101, Oil Yellow #103, Oil Pink #312, Oil Green BG, Oil Blue BOS, Oil Blue #603, Oil Black BY, Oil Black BS, Oil Black T-505 (these are manufactured by Orient Chemical Industry Co.), Victoria Blue, Crystal Violet (CI42555), Methyl Violet (CI42535), Ethyl Violet, Rhodamine B (CI145170B), Malachite Green (CI42000), Methylene Blue (CI52015) and the like are listed. Dyes described in JP-A No. 62-293247 are particularly preferable. These dyes can be added to a printing material in a proportion of from 0.01 to 10% by weight based on the total amount of solid components in the printing material, and preferably from 0.1 to 3% by weight.

Further, a plasticizer may be added to the printing plate material of the present invention, for imparting flexibility of a film and the like, if necessary. For example, butylphthalyl, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, oligomers and polymers of acrylic acid and methacrylic acid, and the like are used.

A recording layer coating solution containing the image-formation material of the present invention, or coating solution components of a desired layer such as a protective layer or the like, can be dissolved in a solvent and applied to a suitable substrate, to produce an image-formation material. Examples of the solvent herein used include, but are not limited to, ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetoamide, N,N-dimethylformamide, tetramethylurea, N-methylpyrrolidone, dimethylsulfoxide, sulfolane, γ-butyrolactone, toluene, water and the like. These solvents can be used alone or in admixture. The concentration of the above-mentioned components (all solid components including additive) in the solvent is preferably from 1 to 50% by weight. The coating amount after drying (solid component) on the substrate differs depending on use, and is preferably from 0.5 to 5.0 $g/m^2$, in general, for a photosensitive printing plate.

As the coating method., various methods can be used. For example, bar coater coating, rotation coating, spray coating, curtain coating, dip coating, air knife coating, blade coating, roll coating and the like are listed. When the coating amount decreases, apparent sensitivity increases but the film property of the recording layer decreases.

Surfactants for improving coatability, for example, fluorine-based surfactants as described in JP-A No. 62-170950, can be added to the recording layer coating solution using the image-formation material in the present invention. A preferable addition amount is from 0.01 to 1% by weight, further preferably from 0.05 to 0.5% by weight, based on the whole printing plate material.

The substrate used for the image-formation material of the present invention is a dimensionally stable plate., and examples thereof include paper, paper laminated with a plastic (e.g., polyethylene, polypropylene, polystyrene and the like), metal plates (e.g., aluminum, zinc, copper and the like), plastic films (e.g., cellulose diacetate, cellulose triacetate, cellulose propionate, cellulose butyrate, cellulose acetate butyl ate, cellulose nitrate, polyethylene terephthalate, polyethylene, polystyrene, polypropylene, polycarbonate, polyvinyl acetal and the like), paper laminated or deposited with metals as described above, and plastic films and the like.

As the substrate used in the image-formation material of the present invention, polyester films and aluminum plates are preferable. Of these, an aluminum plate, which has excellent dimension stability and is relatively cheap, is particularly preferable. A suitable aluminum plate is a pure aluminum plate or an alloy plate containing aluminum as the main component and containing trace amounts of hetero elements. Further, a plastic film laminated or deposited with aluminum may be permissible. As the hetero elements contained in the aluminum alloy, silicon, iron, manganese, copper, magnesium, chromium, bismuth, nickel, titanium and the like are listed. The content of hetero elements in the alloy is at most 10% by weight. A particularly suitable aluminum in the present invention is pure aluminum. However, since completely pure aluminum is difficult to produce from the refining technology standpoint, trace amounts of hetero elements may be contained. Thus, the aluminum plate applied to the present invention is not specified regarding composition, and aluminum plates made of conventionally-known and used raw materials can be utilized appropriately. The aluminum plate used in the present invention has a thickness of about from 0.1 mm to 0.6 mm, preferably from 0.15 mm to 0.4 mm, and particularly preferably from 0.2 mm to 0.3 mm.

Prior to roughening of the aluminum plate, there is conducted a degreasing treatment with, for example, a surfactant, organic solvent, alkaline aqueous solution or the like, for removing a rolling oil from the surface, if necessary.

The treatment for roughening the surface of the aluminum plate may be conducted by various methods and may be, for example, effected by a method of mechanical roughening, a method of dissolving and roughening the surface electrochemically, or a method of selectively dissolving the surface chemically. As the mechanical method, known methods such as a ball polishing method, brush polishing method, blast polishing method, buff polishing method or the like can be used. As the electrochemical roughening method, there are methods conducted by alternating current or direct current in hydrochloric acid or nitric acid electrolytes. Further, a method obtained by combining both of these can also be utilized, as disclosed in JP-A No. 54-63902.

An aluminum plate thus surface-roughened is subjected to an alkali etching treatment and neutralization treatment if necessary, and then subjected to an anodizing treatment for enhancing water-retaining property and abrasion resistance of the surface, if desired. As the electrolyte used in the anodizing treatment of the aluminum plate, use of various electrolytes for forming a porous oxide film is possible. In general, sulfuric acid, phosphoric acid, oxalic acid, chromic acid or a mixed acid thereof is used. The concentration of these electrolytes is appropriately selected depending on the kind of electrolyte.

Treatment conditions of anodizing cannot be generally specified since they change variously depending on electrolytes used. However, in general, it is appropriate that concentration of electrolytes is from 1 to 80% by weight, liquid temperature is from 5 to 70° C., current density is from 5 to 60 $A/dm^2$, voltage is from 1 to 100 V, and electrolysis time is from 10 seconds to 5 minutes.

If the amount of an anodized film is less than 1.0 $g/m^2$, printing endurance will be insufficient, and non-image parts on the planographic printing plate will be easily scratched, leading to a tendency of so-called "scratch staining" in which ink adheres to scratched parts in printing.

After performing the anodizing treatment, a hydrophilization treatment is performed on the surface of the aluminum, if necessary. As the hydrophilization treatment used in the present invention, there is an alkali metal silicate (for example, sodium silicate aqueous solution) method as disclosed in U.S. Pat. Nos. 2,714,066, 3,181,461, 3,280,734 and 3,902,734. In this method, the substrate is immersed in a sodium silicate aqueous solution, or electrolyzed. In addition, there are methods of treatment with potassium zirconate fluoride, disclosed in JP-B No. 36-22063, or polyvinyl phosphonic acid as disclosed in U.S. Pat. Nos. 3,276,868, 4,153,461 and 4,689,272.

The image-formation material of the present invention comprises a substrate carrying thereon a recording layer provided with the image-formation layer of the present invention. If necessary, a primer layer can be provided therebetween.

As the primer layer components, various organic compounds can be used and, for example, selected from carboxymethylcellulose, dextrin, gum Arabic; phosphonic acids having an amino group such as 2-aminoethylphosphonic acid and the like; organic phosphonic acids such as phenylphosphonic acid, naphthylphosphonic acid, alkylphosphonic acid, glycerophosphonic acid, methylenediphosphonic acid, ethylene diphosphonic acid and the like optionally having a substituent; organic phosphoric acid such as phenylphosphoric acid, naphthylphosphoric acid, alkylphosphoric acid, glycerophosphoric acid and the like optionally having a substituent; organic phosphinic acids such as phenylphosphinic acid, naphthylhphosphinic acid, alkylphosphinic acid, glycerophosphinic acid and the like optionally having a substituent; amino acids such as glycine, β-alanine and the like; and hydrochlorides of amines having a hydroxy group such as a hydrochloride of triethanolamine and the like; and two or more of these may be mixed for use.

On a planographic printing plate produced as described above, image-wise exposure and developing treatment are performed as usual.

As the light source of an active beam used in image-wise exposure, solid lasers and semiconductor lasers radiating infrared light having wavelengths from 720 to 1200 nm and the like are listed.

In the present invention, light sources having emitting wavelengths from the near-infrared range to the infrared range are preferable, and solid lasers and semiconductor lasers are particularly preferable.

As a development solution and replenishment solution for the image-formation material of the present invention, conventionally known alkaline aqueous solutions can be used. For example, inorganic alkali salts are listed, such as sodium silicate, potassium silicate, sodium tertiary phosphate, potassium tertiary phosphate, ammonium tertiary phosphate, sodium secondary phosphate, potassium secondary phosphate, ammonium secondary phosphate, sodium carbonate, potassium carbonate, ammonium carbonate, sodium hydrogen carbonate, potassium hydrogen carbonate, ammonium hydrogen carbonate, sodium borate, potassium borate, ammonium borate, sodium hydroxide, ammonium hydroxide, potassium hydroxide, lithium hydroxide and the like. Further, organic alkali agents are also used such as monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine, pyridine and the like.

These alkali agents are used alone or in a combination of two or more.

Particularly preferable developing solutions among these alkali agents are silicate aqueous solutions of sodium silicate, potassium silicate and the like. The reason for this is that developing property can be controlled by the concentrations and the ratio of silicon oxide $SiO_2$, which is a component of a silicate, to an alkali metal oxide $M_2O$. Alkali metal silicates as described in JP-A No. 54-62004 and JP-B No. 57-7427 are effectively used.

Further, when development is effected using an automatic developing machine, it is known that a large number of photosensitive plates can be treated without changing the developing solution in a developing tank for a long period of time, by adding an aqueous solution (replenishment solution) having higher alkali strength than the developing solution to the developing solution. This replenishment method is also preferably applied in this invention. Various surfactants and organic solvents can be added to the developing solution and replenishment solution, if necessary, for purposes of enhancing promotion/suppression of the developing solution, dispersion of development residue and ink-affinity of image parts of the printing plate. As preferable surfactants, anionic, cationic, nonionic and ampholytic surfactants are listed.

Reducing agents can also be added to the developing solution and replenishment solution as necessary, such as hydroquinone, resorcin, and sodium salts and potassium salts and the like of inorganic acids such as sulfurous acid, hydrogensulfurous acid and the like. Further, organic carboxylic acids, defoaming agents and hard water softening agents can also be added, if necessary.

The printing plate subjected to development treatment using the above-mentioned developing solution and replenishment solution is subjected to post-treatment with a washing solution, a rinse solution containing surfactants and the like, or a de-sensitizing solution containing gum Arabic and a starch derivative. As a post-treatment when the image-formation material of the present invention is used for a printing plate, these treatments can be variously combined and used.

Recently, automatic developing machines for printing plates have been widely used for rationalization and standardization of plate production work in plate production and printing industries. These automatic developing machines are, in general, composed of a development section and a post-treatment section, and have an apparatus for transporting a printing plate, treating solution vessels, and a spray apparatus. A developing treatment therein is conducted by spraying treating solutions sucked up by pumps through spray nozzles while horizontally transporting a printing plate which has been exposed. Further, recently, there is also known a method in which a printing plate is treated by being immersed and transported by a submerged guide roll in a treating solution vessel filled with a treatment solution. In such automatic treatment, treatment can also be conducted while replenishing a replenishment solution to the treatment solution based on treatment amount, working time and the like.

Further, a so-called disposable treatment method in which treatment is effected with a substantially unused treating solution can also be used.

A photosensitive planographic printing plate using the image-formation material of the present invention will be described. When a planographic printing plate obtained by image-wise exposure, development, water-washing and/or rinse and/or gum-drawing carries unnecessary image parts (for example, a film edge trace of an original picture film and the like), the unnecessary image parts should be eliminated. For such elimination, a method, for example, as described in JP-B No. 2-13293, in which an elimination solution is applied to the unnecessary image parts, left as is for a given time, and then washed with water is preferably used. However, a method can also be used, as described in JP-A No. 59-174842, in which an active beam introduced through an optical fiber is allowed to irradiate the unnecessary image parts before development.

The planographic printing plate obtained as described above can be, after application of desensitizing gum as necessary, subjected to a printing process. If a planograhpic printing plate having higher printing endurance is desired, a burning treatment is performed.

When a planographic printing plate is subjected to the burning treatment, it is preferable to conduct a treatment with a surface smoothing solution as described in JP-B Nos. 61-2518 and 55-28062, JP-A Nos. 62-31859 and 61-159655, before the burning treatment, As this treatment, a method in which the surface smoothing solution is applied to the planographic printing plate using a sponge or absorbent cotton impregnated with this solution, a method in which the printing plate is immersed in a bath filled with the surface smoothing solution to effect coating onto the plate, a method with an automatic coater, and the like can be applied. Further, more preferable results are obtained if, after coating, the applied amount is made uniform by a squeegee or squeeze roller.

The amount of the surface smoothing solution applied is, in general, suitably from 0.03 to 0.8 g/m$^2$ (dry weight).

The planographic printing plate onto which the surface smoothing agent has been applied is dried if necessary, and then heated to a high temperature by a burning processor (for example, a burning processor: "BP-1300", available from Fuji Photo Film Co., Ltd.) or the like. In this case, it is preferable that the heating temperature is from 180 to 300° C. and the heating time is from 1 to 20 minutes, depending on the kinds of image-forming components.

On the planographic printing plate which has been subjected to the burning treatment, conventionally conducted treatments such as washing with water, gum-drawing and the like can be performed appropriately if necessary. However, if a surface smoothing solution containing a water-soluble polymer compound or the like is used, so-called de-sensitizing treatments such as gum drawing and the like can be omitted.

The planographic printing plate obtained by such treatments is subjected to treatment in an offset printing machine, and used for printing a large number of sheets.

EXAMPLES

The following examples will illustrate the present invention, but do not limit the scope of the present invention.

[Synthesis of Infrared Absorber]

1. Synthesis of Exemplary Compound (IR-5) Included in General Formula (1)

9.5 g of p-toluenesulfonyl chloride and 18.2 g of 1H, 1H, 2H, 2H-perfluorooctan-1-ol were dissolved in 50 ml of acetone. This solution was stirred while cooling with ice, and 5.6 g of triethylamine was added to this dropwise over 10 minutes. This reaction solution was raised to room temperature, the solution was stirred for 6 hours, and then poured into 250 ml of water. An organic layer was extracted with ethyl acetate, washed with water, and then dried over sodium sulfate. The solvent was distilled off under reduced pressure to obtain 24.4 g of 1H, 1H, 2H, 2H-perfluorooctyl p-toluenesulfonate.

17.1 g of 1H, 1H, 2H, 2H-perfluorooctyl p-toluenesulfonate and 4.78 g of 2,3,3-trimethylindolenine were mixed in a reaction vessel, and this mixture was heated at 100° C. and stirred for 1 hour. This reaction solution was cooled to room temperature. 5.39 g of N-(3-(anilinomethylene)-2-chloro-1-cyclohexen-1-yl)methylene)aniline hydrochloride, 60 ml of methanol and 6.13 g of acetic anhydride was added, and the mixture was stirred for 10 minutes while cooling with water. 6.07 g of triethylamine was slowly added dropwise to the reaction solution, and the mixture was stirred for 2 hours at room temperature. The reaction solution was cooled to about 0° C. A precipitate was filtrated, and washed with water to obtain 6.5 g of the exemplary compound (IR-4) ($\lambda_{max}$=795 nm, $\epsilon$=270,000, in methanol).

Counter ions of 5.0 g of the exemplary compound (IR-4) were substituted by perchlorate ions by an ordinary method, to obtain 4.3 g of an exemplary compound (IR-5) ($\lambda_{max}$=795 nm, $\epsilon$=270,000, in methanol).

2. Synthesis of Exemplary Compound (IR-18) Included in General Formula (2)

19 g of 1H, 1H, 2H, 2H-perfluorooctanethiol and 2.70 µg of sodium methoxide were dissolved in 100 ml of methanol, and to thus solution was added, a little bit at a time, 37.8 g of 2-(2-(2-chloro-3-(2-(1,3-dihydro-1,1,3-trimethyl-2H-benzo[e]-indol-2-ylidene)-ethylidene)-1-cyclohexen-1-yl)-ethenyl)-1,1,3-trimethyl-1 H-benz[e]indolium, p-toluene sulfonate (a compound used as infrared absorption agent in JP-A No. 7-271029, Example (1)) portion-wise while stirring at room temperature. After stirring for 4 hours, the reaction solution was poured into 1,000 ml of water. A precipitate was filtrated off, and washed with water to obtain 27.5 g of the exemplary compound (IR-18) ($\lambda_{max}$=820 nm, $\epsilon$=230,000, in methanol).

3. Synthesis of Exemplary Compound (IR-24) Included in General Formula (3)

51.8 g of 2-(N-ethylanilino)ethanol and 31.7 g of triethylamine were dissolved in 320 ml of acetone, and to this solution 24.9 g of acetyl chloride was slowly added dropwise while stirring under ice cooling. This mixture was stirred for 3 hours at room temperature, and the reaction solution was poured into 500 ml of water. An organic layer was extracted with ethyl acetate, washed with water, and then dried over sodium sulfate. The solvent was distilled off under reduced pressure to obtain 64.9 g of 2-(ethylphenylamino)ethyl acetate.

To 16.1 g of dimethylformamide was dropwise added 33.7 g of phosphoryl chloride while stirring under ice cooling. Further, 30 ml of a solution of 41.5 g of 2-(ethylphenylamino)ethyl acetate in dimethylformamide was added dropwise, and this mixture was stirred for 5 hours at 40° C. This reaction solution was poured into 1,000 ml of sodium acetate aqueous solution. An organic layer was extracted with ethyl acetate, washed with water, and then dried over sodium sulfate. The solvent was distilled off under reduced pressure, and the resulting coarse product was purified by silica gel column chromatography to obtain 35.3 g of 2-(ethyl(4-formylphenyl) amino) ethyl acetate.

23.5 g of 2-(ethyl(4-formylphenyl)amino)ethyl acetate, 4.91 g of cyclohexanone and 150 ml of ethanol were mixed and to this was added an aqueous solution (25 ml) of 2.2 g of sodium hydroxide while stirring at 50° C. This mixture was further stirred for 5 hours. After cooling to room temperature, a precipitate was filtrated, and washed with a small amount of ethanol and water to obtain 41.5 g of 2,6-bis((4-(ethyl(2-hydroxyethyl) amino)phenyl)methylene) cyclohexan-1-on e.

35.9 g of 2,6-bis((4-(ethyl(2-hydroxyethyl)amino)phenyl) methylene)-cyclohexan-1-one, 16.2 g of triethylamine and 160 ml of acetone were mixed and to this was added 69.2 g of perfluorooctanoyl chloride while stirring under ice cooling. After stirring for 4 hours at room temperature, this reaction solution was poured into 900 ml of water, and a precipitate was filtrated to obtain 89.3 g of 2,6-bis((4-(ethyl (2-perfluorooctanoyloxyethyl)amino)phenyl)methylene)cyclohexane-1-one.

24.8 g of 2,6-bis((4-(ethyl(2-perfluorooctanoyloxyethyl) amino)phenyl)methylene)cyclohexane-1-one, 150 g of tetrahydrofuran and 100 g of tetrahydrofurfuryl alcohol were mixed, and to this was added 0.76 g of sodium borate hydride while stirring. This mixture was stirred for 6 hours at 50° C. To this was added 20 g of acetic acid and 3.7 g of a 60% perchloric acid aqueous solution, and a precipitate was filtrated off to obtain 16.1 g of the exemplary compound (IR-24) ($\lambda_{max}$=782 nm, $\epsilon$190,000, in acetone).

4. Synthesis of Exemplary Compound (IR-29) Included in General Formula (4)

14.3 g of stearylmercaptane, 2.70 g of sodium methoxide and 500 ml of methanol were mixed, and to this solution was added, a little bit at a time, 37.8 g of 2-(2-(2-chloro-3-(2-(1,3-dihydro-1,1,3-trimethyl-2H-benzo[e]-indol-2-ylidene)-ethylidene)-1-cyclohexen-1-yl)-ethenyl)-1,1,3-trimethyl-1H-benz[e]indolium, p-toluene sulfonate (the compound used as the infrared absorption agent in JP-A No. 7-271029, Example (1)) while stirring at room temperature. After stirring for 4 hours, this reaction solution was poured into 1,000 ml of water. A precipitate was filtrated off, and washed with water to obtain 26.8 g of the exemplary compound (IR-29) ($\lambda_{max}$=814 nm, $\epsilon$=260,000, in methanol).

Example 1

Example of a Positive Image-Formation Material

[Production of Substrate]

An aluminum plate (material 1050) having a thickness of 0.3 mm was degreased by washing with trichloroethylene. Then, the surface thereof was grained using a nylon brush and a pumice-water suspension of 400 mesh, and washed thoroughly with water. This plate was immersed in a 25% aqueous sodium hydroxide solution at 45° C. for 9 seconds to effect etching, and washed with water, then further immersed in a 20% nitric acid solution for 20 seconds, and washed with water. The etched amount of the grained surface in this procedure was about 3 g/m$^2$. Then, the plate was treated with a current density of 15 A/dm$^3$ using 7% sulfuric acid as an electrolyte, to form thereon a direct current anodized film of 3 g/m$^2$. Then, the plate was washed with water and dried, a primer solution described below was applied thereto, and the film was dried at 90° C. for 1 minute. The amount of the film applied after drying was 10 mg/m$^2$.

| Primer solution | |
| --- | --- |
| β-Alanine | 0.5 g |
| Methanol | 95 g |
| Water | 5 g |

On the obtained substrate, the following photosensitive layer coating solution [A] was applied to give a coating amount of 1.8 g/m$^2$, to obtain a planographic printing plate [A-1].

(Photosensitive Layer Coating Solution [A])

| | |
| --- | --- |
| m,p-Cresol novolak (m/p ratio = 6/4, weight-average molecular weight 3,500, containing unreacted cresol 0.5% by weight) | 1.0 g |
| Infrared absorption agent (exemplary compound IR-5) | 0.2 g |
| Dye obtained by setting counter ion in Victoria Pure Blue BOH to 1-naphthalenesulfonate anion | 0.02 g |
| Fluorine-based nonionic surfactant (trade name: Megafac F-177, Dainippon Ink & Chemicals Inc.) | 0.05 g |

| -continued | |
| --- | --- |
| γ-Butyrolactone | 3 g |
| Methyl ethyl ketone | 8 g |
| 1-Methoxy-2-propanol | 7 g |

Examples 2 and 3

Planographic printing plates [A-2] and [A-3] were obtained in the same manner as in Example 1 except that the infrared absorption agent compounded in the photosensitive layer coating solution [A] in Example 1 was replaced with the exemplary compounds described in the following table 1.

Comparative Example 1

A planographic printing plate [A-C] was obtained in the same manner as in Example 1 except that the infrared absorption agent compounded in the photosensitive layer coating solution [A] in Example 1 was replaced with IR-792 perchlorate (manufactured by Sigma Aldrich Japan K.K.) having the following structure.

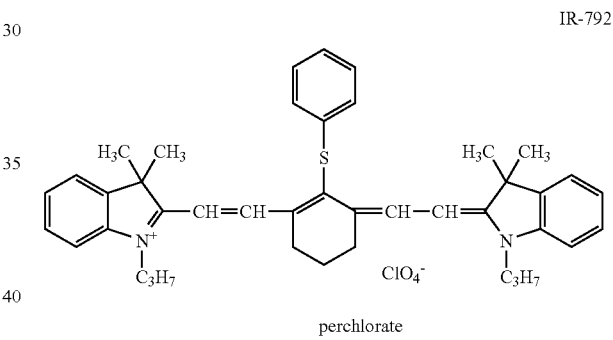

IR-792 perchlorate

Example 4

The following photosensitive layer coating solution [B] was applied to a substrate obtained in the same manner as in Example 1 such that a coating amount was 1.6 g/m$^2$, to obtain a planographic printing plate [B-1].

(Photosensitive Layer Coating Solution [B])

| | |
| --- | --- |
| m,p-Cresol novolak (m/p ratio = 6/4, weight-average molecular weight 3,500, containing unreacted cresol 0.5% by weight) | 0.3 g |
| Copolymer 1 described in JP-A No. 11-348443 | 0.7 g |
| Bis(4-hydroxyphenyl)sulphone | 0.1 g |
| Infrared absorption agent (exemplary compound IR-5) | 0.15 g |
| p-Toluenesulfonic acid | 0.002 g |
| Dye obtained by setting counter ion in Victoria Pure Blue BOH to 1-naphthalenesulfonate anion | 0.02 g |
| Fluorine-based nonionic surfactant (trade name: Megafac F-177, Dainippon Ink & Chemicals Inc.) | 0.05 g |
| γ-Butyrolactone | 8 g |
| Methyl ethyl ketone | 8 g |
| 1-Methoxy-2-propanol | 4 g |

Examples 5 to 6

Planographic printing plates [B-2] and [B-3] were obtained in the same manner as in Example 4 except that the infrared absorption agent compounded in the photosensitive layer coating solution [B] in Example 4 was replaced with the exemplary compounds described in the following table 1.

Comparative Example 2

A planographic printing plate [B-C] was obtained in the same manner as in Example 4 except that the infrared absorption agent compounded in the photosensitive layer coating solution [B] in Example 4 was replaced with IR-792 perchlorate (manufactured by Sigma Aldrich Japan K.K.).

[Evaluation of Performance of Planographic Printing Plates]

Regarding the positive planographic printing plates of Examples 1 to 6 and Comparative Examples 1 and 2 produced as described above, evaluation of performance was conducted according to the following standards. Evaluation results are shown in Table 1.

-Sensitivity-

The obtained planographic printing plates were exposed using a semiconductor laser having an output of 500 mW, a wavelength of 830 nm and a beam diameter of 17 μm ($1/e^2$) at a main scanning rate of 5 m/sec. Then, development was conducted using an automatic developing machine (manufactured by Fuji Photo Film Co., Ltd.; trade name: PS Processor 900 VR) charged with a developing solution DP-4 and a rinse liquid FR-3 (1:7), both manufactured by Fuji Photo Film Co., Ltd. In this procedure, DP-4 was diluted with water at 1:8. Line widths of non-image parts obtained using this developing solution were measured, and an irradiation energy of the laser that corresponded to these line width was calculated as sensitivity. Values of measured sensitivity are shown in Table 1.

TABLE 1

| | Planographic printing plate | Infrared absorption agent | Sensitivity (mJ/cm$^2$) |
|---|---|---|---|
| Example 1 | A-1 | IR-5 | 175 |
| Example 2 | A-2 | IR-18 | 175 |
| Example 3 | A-3 | IR-29 | 185 |
| Comparative Example 1 | A-C | IR-792 perchlorate | 210 |
| Example 4 | B-1 | IR-5 | 160 |
| Example 5 | B-2 | IR-18 | 165 |
| Example 6 | B-3 | IR-24 | 155 |
| Comparative Example 2 | B-C | IR-792 perchlorate | 190 |

As is apparent from Table 1, it was found that a planographic printing plate using the image-formation material of the present invention has higher sensitivity and more excellent image-forming property as compared with a known infrared absorption agent.

Examples 7 to 10

Examples of Negative Image-Formation Materials (Photosensitive Layer Coating Solution [C])

| | |
|---|---|
| Diazonium salt of general formula (1) used in Example 1 described in JP-A No. 11-352679 | 0.15 g |
| Infrared absorption agent (exemplary compound IR-5) | 0.10 g |
| Poly p-hydroxystyrene resin (weight-average molecular weight 10,000) | 1.5 g |
| Crosslinking agent (having the structure below) | 0.50 g |
| Fluorine-based nonionic surfactant (trade name: Megafac F-177, Dainippon Ink & Chemicals Inc.) | 0.03 g |
| Methyl ethyl ketone | 15 g |
| 1-Methoxy-2-propanol | 10 g |
| Methyl alcohol | 5 g |

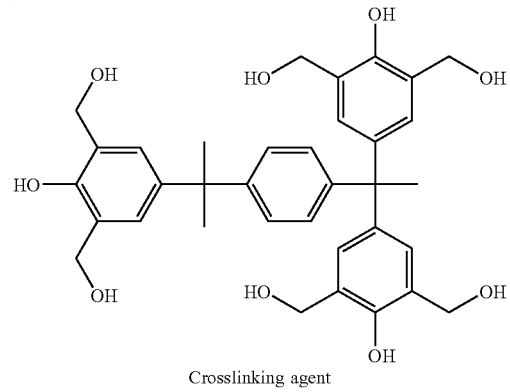

Crosslinking agent

In a photosensitive layer coating solution [C] having the above-mentioned composition, the kind of infrared absorption agent was changed as shown in Table 2, to obtain four kinds of coating solution [C-1] to [C-4]. These solutions were applied in the same manner as in Example 1, and dried at 100° C. for 1 minute, to obtain negative planographic printing plates [C-1] to [C-4] as Examples 7 to 10. The coating weight after drying was 1.3 g/m$^2$.

The obtained negative planographic printing plates [C-1] to [C-4] were exposed with a semiconductor laser emitting infrared light having a wavelength of 830 nm, the same as in Example 1. After exposure, the plates were heated for 1 minute in an oven at 140° C., and then passed through an automatic developing machine charged with the developing solution DP-4 (1:4) and rinse liquid FR-3 (1:7), manufactured by Fuji Photo Film Co., Ltd. In each case, an excellent negative image was obtained.

Comparative Example 3

A negative planographic printing plate [C—C] (Comparative Example 3) was obtained in the same manner as in Examples 7 to 10, except that the infrared absorption agents used in Examples 7 to 10 were replaced with IR-792 perchlorate in the photosensitive layer coating solution [C].

The obtained planographic printing plate [C—C] was subjected to exposure, heat treatment and development in the same manner as for Examples 7 to 10, and sensitivity was measured in the same manner as for Examples 1 to 6. The results are shown in Table 2.

TABLE 2

| | Planographic printing plate | Infrared absorption agent | Sensitivity (mJ/cm$^2$) |
|---|---|---|---|
| Example 7 | C-1 | IR-5 | 125 |
| Example 8 | C-2 | IR-18 | 115 |
| Example 9 | C-3 | IR-24 | 115 |
| Example 10 | C-4 | IR-29 | 125 |
| Comparative Example 3 | C-C | IR-792 perchlorate | 160 |

As is apparent from Table 2, it was found that, also in the case of using a negative image-formation material, a planographic printing plate using the infrared absorption agent of the present invention has higher sensitivity and more excellent image-forming property as compared with a known infrared absorption agent.

Examples 11 to 12

Examples of Negative Image-Formation Material (Photosensitive layer coating solution [D])

| | |
|---|---|
| Iodonium salt of the structure below | 0.67 g |
| Infrared absorption agent | 0.27 g |
| Allyl methacrylate-methacrylic acid copolymer (molar ratio 87:13, MW = 100,000) | 3.3 g |
| Dipentaerythritol hexaacrylate (DPHA) [manufactured by Nippon Kayaku Co., Ltd.] | 3.3 g |
| Dye obtained by setting counter ion in Victoria Pure Blue BOH to 1-Naphthalenesulfonate anion | 0.13 g |
| Fluorine-based nonionic surfactant (trade name: Megafac F-177, Dainippon Ink & Chemicals Inc.) | 0.1 g |

-continued

| | |
|---|---|
| Methyl ethyl ketone | 33 g |
| 1-Methoxy-2-propanol | 20 g |
| Methyl alcohol | 26 g |

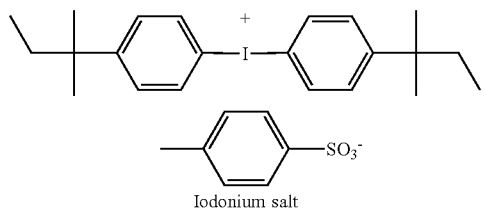

Iodonium salt

In a photosensitive layer coating solution [D] having the above-mentioned composition, the kind of infrared absorption agent was changed as shown in Table 3 to obtain two kinds of coating solution, [D-1] and [D2]. These solutions were applied on to a substrate in the same manner as for Example 1, and dried at 115° C. for 45 seconds, to obtain negative planographic printing plates [D-1] and [D-2] as Examples 11 and 12. The coating weight after drying was 1.4 g/m².

The obtained negative planographic printing plates [D-1] and [D-2] were exposed with a semiconductor laser emitting infrared light having a wavelength of 830 nm, the same as in Examples 1 to 10, and then passed through an automatic developing machine charged with DN-3C (1:2), a developing solution manufactured by Fuji Photo Film Co., Ltd., and the rinse liquid FR-3 (1:7). In both cases, an excellent negative image was obtained.

Comparative Example 4

A negative planographic printing plate [D-C] (Comparative Example 4) was obtained in the same manner as in Examples 11 to 12 except that the infrared absorption agent in the photosensitive layer coating solution [D] used in Examples 11 to 12 was replaced with IR-786 perchlorate (manufactured by Sigma Aldrich Japan K.K.).

The obtained planographic printing plate [D-C] was subjected to exposure, heat treatment and development in the same manner as for Examples 11 to 12, and sensitivity was measured in the same manner as for Examples 1 to 10. The results are shown in Table 3.

TABLE 3

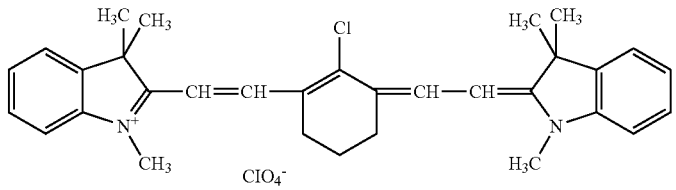

IR-786 perchlorate

| | Planographic printing plate | Infrared absorption agent | Sensitivity (mJ/cm²) |
|---|---|---|---|
| Example 11 | D-1 | IR-18 | 140 |
| Example 12 | D-2 | IR-29 | 145 |
| Comparative Example 4 | D-C | IR-786 perchlorate | 160 |

From the results shown in Table 3, it was found that both of the planographic printing plates of Examples 11 and 12 had higher sensitivity and more excellent image-forming property as compared with that obtained by using a known infrared absorption agent.

From the above-described examples, it was found that the present invention can provide an image-formation material having high sensitivity and also excellent image-forming property, by use of the above-described specific infrared absorption agent.

Further, a planographic printing plate using this image-formation material can perform direct plate production with an infrared laser, and has high sensitivity and excellent image-forming property.

The image-formation material of the present invention shows high sensitivity to an infrared laser and excellent image formation property. Further, a planographic printing plate using this image-formation material provides effects such that direct plate production is possible with an infrared laser-, sensitivity is high and image formation property is excellent.

What is claimed is:

1. An infrared absorber comprising, in a molecule thereof, a fluorine-containing substituent which has at least 5 fluorine atoms, wherein said infrared absorber is represented by general formula (1) as follows:

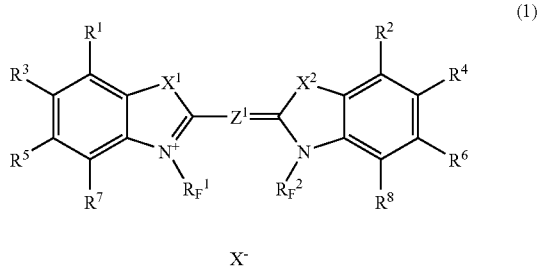

in which formula: each of $R_F^1$ and $R_F^2$ independently represents a fluorine-containing substituent having at least 5 fluorine atoms; each of $X^1$ and $X^2$ independently represents —$CR^9R^{10}$—, —S—, —Se—, —$NR^{11}$—, —CH=CH— or —O—; $R^1$ to $R^8$ each independently represents a hydrogen atom, alkyl group, alkoxy group or halogen atom; $R^1$ to $R^8$ may represent a plurality of atoms such that at least one of pairs $R^1$ and $R^3$, $R^2$ and $R^4$, $R^5$ and $R^7$, $R^6$ and $R^8$, $R^1$ and $X^1$, and $R^2$ and $X^2$ can be mutually connectable to form an aliphatic 5-membered ring or 6-membered ring, an aromatic 6-membered ring or a substituted aromatic 6-membered ring;

$R^9$ and $R^{10}$ each independently represents an alkyl group, or represent =CH— which are combined to form a ring; $R^{11}$ represents an alkyl group;

$Z^1$ represents a heptamethine group, which may have one or more substituents selected from the group consisting of alkyl groups, halogen atoms, amino groups, arylthio groups, alkylthio groups, aryloxy groups, alkoxy groups, barbituric groups and thiobarbituric groups, and which may include a cyclohexene or cyclopentene ring formed by mutually bonding substituents on two methine carbons of the heptamethine group, which ring may further have a substituent selected from the group consisting of alkyl groups and halogen atoms; and $X^-$ represents a counter ion required for neutralizing an electric charge.

2. An infrared absorber comprising, in a molecule thereof, a fluorine-containing substituent which has at least 5 fluorine atoms, wherein said infrared absorber is represented by general formula (2) as follows:

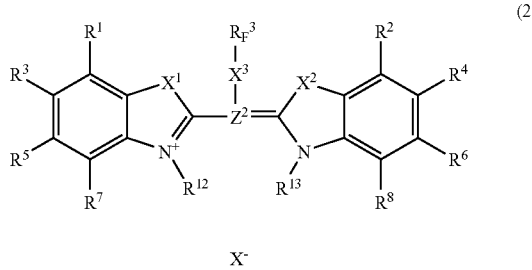

in which formula: $R_F^3$ represents a fluorine-containing substituent having at least 5 fluorine atoms; $X^3$ represents —NH—, —O— or —S—; each of $R^{12}$ and $R^{13}$ independently represents an alkyl group;

each of $X^1$ and $X^2$ independently represents —$CR^9R^{10}$—, —S—, —Se—, —$NR^{11}$—, —CH=CH— or —O—; $R^1$ to $R^8$ each independently represents a hydrogen atom, alkyl group, alkoxy group or halogen atom; $R^1$ to $R^8$ may represent a plurality of atoms such that at least one of pairs $R^1$ and $R^3$, $R^2$ and $R^4$, $R^5$ and $R^7$, $R^6$ and $R^8$, $R^1$ and $X^1$, and $R^2$ and $X^2$ can be mutually connectable to form an aliphatic 5-membered ring or 6-membered ring, an aromatic 6-membered ring or a substituted aromatic 6-membered ring;

$R^9$ and $R^{10}$ each independently represents an alkyl group, or represent =CH— which are combined to form a ring; $R^{11}$ represents an alkyl group;

$X^-$ represents a counter ion required for neutralizing an electric charge; and $Z^2$ represents a polymethine chain of at least 5 carbon atoms.

3. An infrared absorber comprising, in a molecule thereof, a fluorine-containing substituent which has at least 5 fluorine atoms, wherein said infrared absorber is represented by general formula (3) as follows:

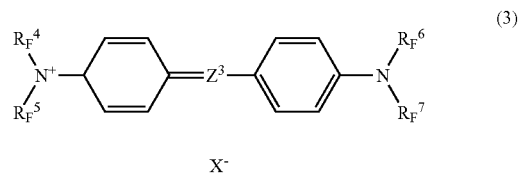

in which formula: each of $R_F^4$, $R_F^5$, $R_F^6$ and $R_F^7$ independently represents a fluorine-containing substituent having at least 5 fluorine atoms or an alkyl group, and at least one of $R_F^4$, $R_F^5$, $R_F^6$ and $R_F^7$ represents a fluorine-containing substituent having at least 5 fluorine atoms; $Z^3$ represents a pentamethine group, which may have a substituent selected from the group consisting of halogen atoms, hydroxyl groups, alkyl groups optionally having a further substituent, aryl groups optionally having a further substituent and heterocyclic groups, and which may also contain a cyclohexene or cyclopentene ring formed by mutually bonding substituents on two methine carbons of the pentamethine group, which ring may further have a substituent selected from the group consisting of alkyl groups and halogen atoms; and $X^-$ represents a counter ion required for neutralizing an electric charge.

4. An infrared absorber comprising a polymethine chain of at least 5 carbon atoms and an alkyl group of at least 8 carbon atoms, said alkyl group being connected to the polymethine chain via any of nitrogen, oxygen and sulfur.

5. An infrared absorber according to claim 4 wherein said infrared absorber is represented by general formula (4) as follows:

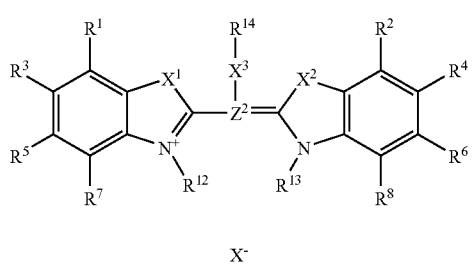

(4)

in which formula: $R^{14}$ represents an alkyl group of at least 8 carbon atoms; $X^3$ represents —NH—, —O— or —S—; each of $R^{12}$ and $R^{13}$ independently represents an alkyl group; each of $X^1$ and $X^2$ independently represents —$CR^9R^{10}$—, —S—, —Se—, —$NR^{11}$—, —CH=CH— or —O—;

$R^1$ to $R^1$ each independently represents a hydrogen atom, alkyl group, alkoxy group or halogen atom; $R^1$ to $R^8$ may represent a plurality of atoms such that at least one of pairs $R^1$ and $R^3$, $R^2$ and $R^4$, $R^5$ and $R^7$, $R^6$ and $R^8$, $R^1$ and $X^1$, and $R^2$ and $X^2$ can be mutually connectable to form an aliphatic 5-membered ring or 6-membered ring, an aromatic 6-membered ring or a substituted aromatic 6-membered ring;

$R^9$ and $R^{10}$ each independently represents an alkyl group, or represent =CH— which are combined to form a ring; $R^{11}$ represents an alkyl group;

$X^-$ represents a counter ion required for neutralizing an electric charge; and $Z^2$ represents a polymethine chain of at least 5 carbon atoms.

* * * * *